United States Patent
Ko

(10) Patent No.: US 10,539,169 B2
(45) Date of Patent: *Jan. 21, 2020

(54) CONNECTORS USED IN MODULAR FURNITURE SYSTEM

(71) Applicant: Kenneth H. Ko, Los Angeles, CA (US)

(72) Inventor: Kenneth H. Ko, Los Angeles, CA (US)

( * ) Notice: Subject to any disclaimer, the term of this patent is extended or adjusted under 35 U.S.C. 154(b) by 332 days.

This patent is subject to a terminal disclaimer.

(21) Appl. No.: 15/361,435

(22) Filed: Nov. 27, 2016

(65) Prior Publication Data

US 2017/0138382 A1    May 18, 2017

Related U.S. Application Data

(63) Continuation-in-part of application No. 13/941,126, filed on Jul. 12, 2013, now Pat. No. 9,506,489.

(60) Provisional application No. 61/671,690, filed on Jul. 14, 2012, provisional application No. 61/800,459, filed on Mar. 15, 2013.

(51) Int. Cl.
  *F16B 12/24* (2006.01)
  *A47B 87/02* (2006.01)

(52) U.S. Cl.
  CPC .............. *F16B 12/24* (2013.01); *A47B 87/02* (2013.01); *Y10T 29/4995* (2015.01); *Y10T 403/7045* (2015.01)

(58) Field of Classification Search
  CPC .... A47B 2230/0074; A47B 2230/0077; A47B 2230/0081; A47B 2230/0085; A47B 2230/0095; A47B 2230/07; F16B 2012/046; F16B 12/125; Y10T 403/7015; Y10T 403/7094
  See application file for complete search history.

(56) References Cited

U.S. PATENT DOCUMENTS

| | | | |
|---|---|---|---|
| 3,944,282 | A | 3/1976 | Nakamura |
| 4,900,090 | A | 2/1990 | Davis |
| 4,995,176 | A | 2/1991 | Briscoe et al. |
| 6,612,078 | B2 | 9/2003 | Hawang |
| 6,830,236 | B2 | 12/2004 | Augusto de Lorenzo |
| 6,877,824 | B2 | 4/2005 | Winkless |
| 7,152,752 | B2 | 12/2006 | Kurtenbach |
| 7,534,065 | B2 * | 5/2009 | Rejman .................... B25F 5/02 320/112 |
| 8,464,408 | B2 | 6/2013 | Hazzard |
| 9,506,489 | B2 * | 11/2016 | Ko .......................... A47B 87/02 |
| 2007/0145864 | A1 | 6/2007 | Freedman |

(Continued)

*Primary Examiner* — Michael P Ferguson
(74) *Attorney, Agent, or Firm* — Chen Yoshimura LLP

(57) ABSTRACT

A connector for connecting two furniture modules or other stationary objects to form a modular system. The connector includes two hardware pieces, to be mounted onto two furniture modules, respectively. The first piece fits into the second piece in a loading/unloading position, and then moves to a locked position. One or more detent on one hardware piece and one or more systems of tracks in the other hardware piece are provided to help the two pieces move relative to each other in a guided manner, go into and stay in the locked position, and move out of the locked position into the loading/unloading position when sufficient force is applied. Each system of tracks includes multiple indentations and one or more barriers, where the detent can move along the indentations and is resisted or blocked by the barriers.

6 Claims, 24 Drawing Sheets

(56) References Cited

U.S. PATENT DOCUMENTS

2010/0254757 A1 10/2010 Saul
2011/0085853 A1 4/2011 Liu

* cited by examiner

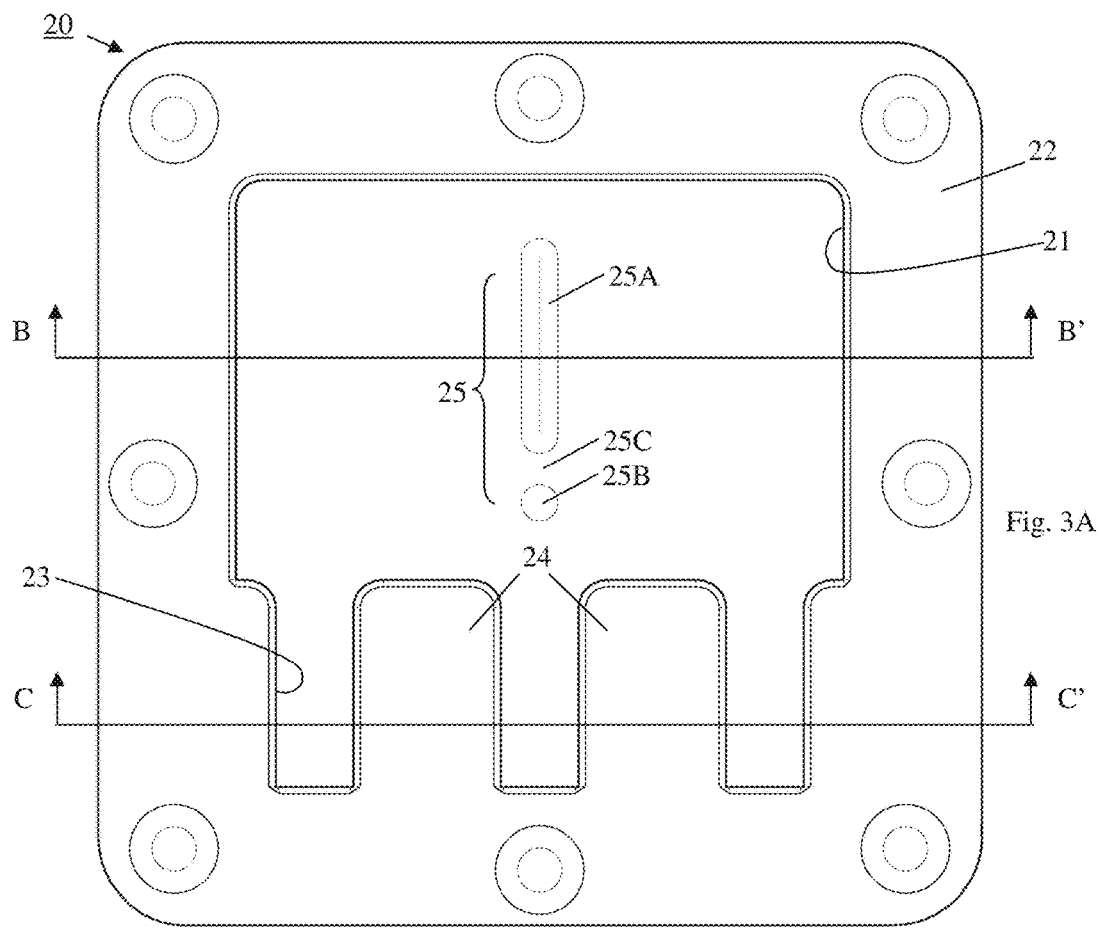
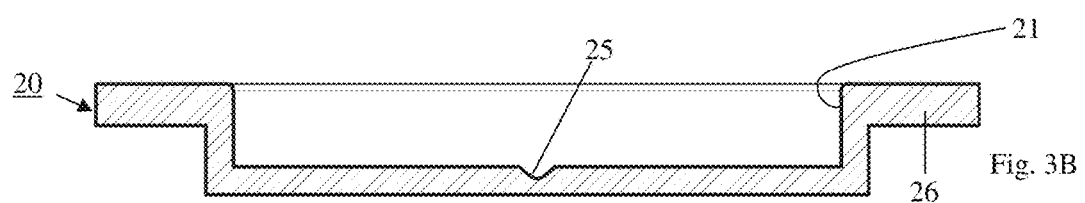
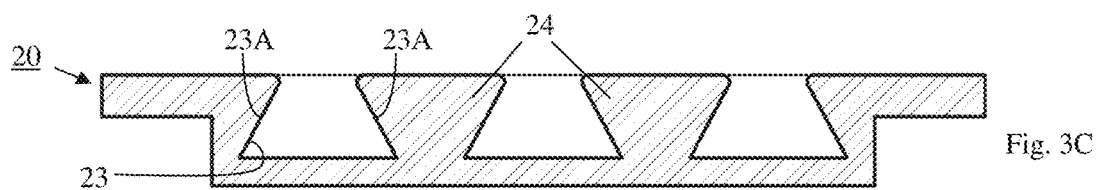

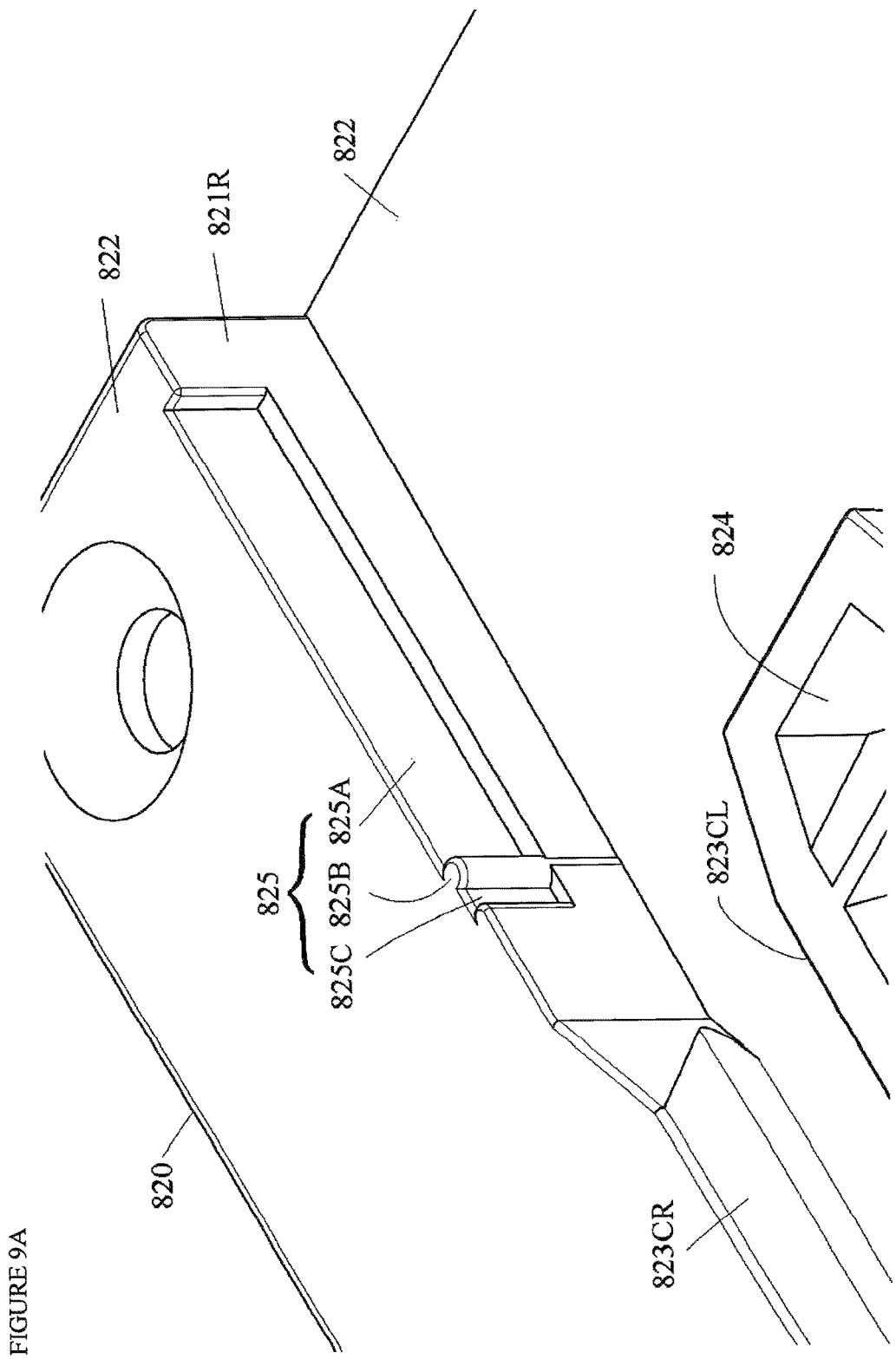

CONNECTORS USED IN MODULAR FURNITURE SYSTEM

This application is a continuation-in-part application under 35 USC § 120 of U.S. patent application Ser. No. 13/941,126, filed Jul. 12, 2013, to be issued as U.S. Pat. No. 9,506,489 on Nov. 29, 2016, which claims priority under 35 USC § 119(e) from U.S. Provisional Patent Application No. 61/671,690, filed Jul. 14, 2012, and U.S. Provisional Patent Application No. 61/800,459, filed Mar. 15, 2013, which are herein incorporated by reference in their entireties.

BACKGROUND OF THE INVENTION

Field of the Invention

This invention relates to furniture, and in particular, it relates to modular furniture systems and connectors useful in modular furniture systems.

Description of the Related Art

Modular furniture systems have the advantages that they can enable furniture users to rearrange parts of the furniture system (flexibility in aesthetics), to recycle certain parts of old furniture and to purchase more precisely what is necessary for each individual living situation at each given moment. Furniture built from combining individual modules creates more available possibilities both aesthetically and functionally, for furniture users given a fixed amount of material. Modular systems also have added value as they can accommodate different materials, including all the common furniture building materials such as, but not limited to wood, particleboard, glass, MDF & various metals (steel, iron, etc.). Many modular furniture systems have been known in the art. Some examples include systems described in U.S. Pat. Nos. 7,152,752, 6,877,824, 3,944,282, and 8,464,408, and U.S. Pat. Appl. Pub. No. 2007/0145864.

SUMMARY OF THE INVENTION

The present invention is directed to a connector device for modular furniture system that substantially obviates one or more of the problems due to limitations and disadvantages of the related art.

An object of the present invention is to provide a modular furniture system and connectors used in such a system that is intuitive for the user, easy to understand, and straight forward and safe to own and operate on an ongoing basis. Another object of the present invention is to provide connectors for modular furniture systems that are simple for furniture designers and manufacturers to adopt in their efforts to maximize end value for the user while minimizing cost of production.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

In one aspect, the present invention provides a set of two pieces of hardware that enables a user to join and securely fasten two pieces of furniture to form one furniture unit; the two pieces of hardware have a loading/unloading state where the two pieces of furniture cannot be separated, a locked state where the two pieces of furniture can be easily separated, and an intuitive transition between the two states. The hardware guides transition from the loading/unloading state to the locked state. In its locked state, the hardware joins two furniture modules so that when outside force is applied horizontally or vertically to any part of the resulting singular unit, the modules do not separate.

To achieve these and other advantages and in accordance with the purpose of the present invention, as embodied and broadly described, the present invention provides a connector for joining two furniture modules or other objects, which includes: a first hardware piece; a second hardware piece having a main cavity for receiving the first hardware piece, wherein the first and second hardware pieces are in an unlocked state when the first hardware piece is received in the main cavity of the second hardware piece, the second hardware piece further having one or more receiving cavities connected to the main cavity for receiving at least a portion of the first hardware piece, wherein the first and second hardware pieces are in a locked state when the portion of the first hardware piece is received in the one or more receiving cavities of the second hardware piece, and wherein the first hardware piece is slidable along a first direction within the second hardware piece to change between the unlocked state and the locked state; and a detent mechanism, including a first part disposed on a first one of the first and second hardware pieces and a second part disposed on a second one of the first and second hardware pieces, wherein the first and second parts of the detent mechanism engage with and cooperate with each other to hold the first and second hardware pieces in the locked state, and to allow the first and second hardware pieces to change from the locked state to the unlocked when a sufficient force is applied, wherein the first part of the detent mechanism comprises a detent member which includes a protruding end that is urged by a resilient biasing member toward a second direction perpendicular to the first direction and is retractable in a direction opposite to the second direction when an external force is applied, wherein the second part of the detent mechanism includes a track formed on the second one of the first and second hardware pieces, wherein the track includes a first section and a second section separated by a barrier, wherein the barrier protrudes more in the direction opposite to the second direction relative to the first section and the second section, and wherein when the first and second hardware pieces move between the unlocked state and the locked state along the first direction, the protruding end of the first part of the detent mechanism moves along the first section of the track and moves between the first section of the track and the second section of the tract over the barrier, wherein the protruding end protrudes less in the second direction when it moves over the barrier, and wherein when the first and second hardware pieces are in the locked state, the protruding end is located in the second section of the track.

In some embodiments, the track has multiple sections and multiple barriers between adjacent sections. In some embodiments, multiple tracks and multiple corresponding detent members are provided.

In another aspect, the present invention provides a modular furniture system, which includes: a first furniture module; a second furniture module; a first hardware piece mounted on a surface of the first furniture module and protruding from the surface of the first furniture module; and a second hardware piece mounted on a surface of the second furniture module, where the first and second hardware pieces have the above described structures.

It is to be understood that both the foregoing general description and the following detailed description are exemplary and explanatory and are intended to provide further explanation of the invention as claimed.

BRIEF DESCRIPTION OF THE DRAWINGS

FIG. 1A shows the two hardware pieces in an unassembled state; FIG. 1B shows them in a loading/unloading state; and FIG. 1C shows them in a locked state.

FIG. 2A is a top plan view; FIGS. 2B and 2C are side cut-away views taken in planes indicated by lines B-B' and C-C' in FIG. 2A, respectively; and FIG. 2D is a side view from the right side of FIG. 2A.

FIGS. 3A-3C illustrate the structure of the second hardware piece of the connector. FIG. 3A is a top view, and FIGS. 3B and 3C are side cut-away views taken in planes indicated by lines B-B' and C-C' in FIG. 3A, respectively.

FIG. 4A shows the two hardware pieces in the unassembled state; FIG. 4B shows them in the loading/unloading state; and FIG. 4C shows them in the locked state.

FIGS. 9A-C are detailed views of the track feature of the second embodiment, where FIG. 9A is a perspective view, FIG. 9B is a top view, and FIG. 9C is a cross sectional view.

FIG. 10A is a perspective view and FIG. 10B is a bottom view.

FIG. 12A is a top view, FIG. 12B is a rear view, and FIG. 12C is a perspective view FIG. 13A is a top view of the plate shaped piece and FIG. 13B is a bottom view of the E shaped piece.

DETAILED DESCRIPTION OF THE PREFERRED EMBODIMENTS

In modular furniture systems, it is important to achieve the advantages of being modular without compromising many features of traditional furniture including its functionality and its ability to withstand reasonable levels of outside force from various directions through every day interaction. It is also important to have flexibility for a designer to straightforwardly achieve a wide range of designs to appeal to different aesthetic preferences.

Embodiments of the present invention provide connectors that can be used to join furniture pieces or modules together to form modular furniture systems. The connectors are a set of hardware including two separate pieces intended to be securely affixed, for example using screws, to the bottom panel or frame of one piece of furniture and the top panel or frame of another separate piece of furniture, respectively.

These two hardware pieces are designed to fit into each other, first, in a semi secure, but stable loading/unloading state for the user to mount and dismount the two modules of furniture he/she intends to join. Then, the hardware has a path that guides the user's movements to bring the two pieces of furniture to a state where it can be locked into a secure, final position for use as one unit of furniture having multiple parts. For example, the unit of furniture may be a single storage unit made of two shelves joined together by the connector hardware instead of two separate standalone shelves.

First Embodiment

Figure 1A:
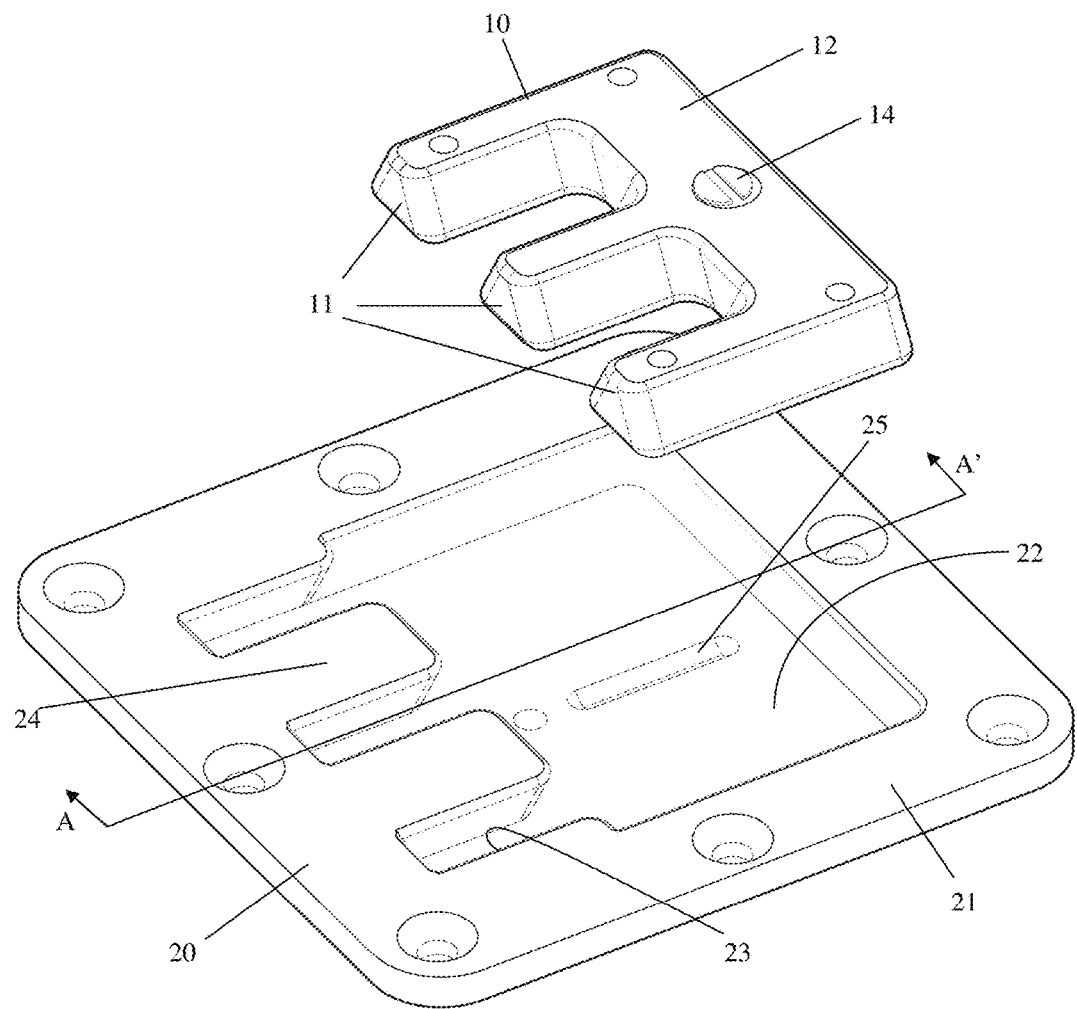
FIGS. 1A-1C are perspective views of the two hardware pieces of the connector according to embodiments of the present invention.
Figure 1B:
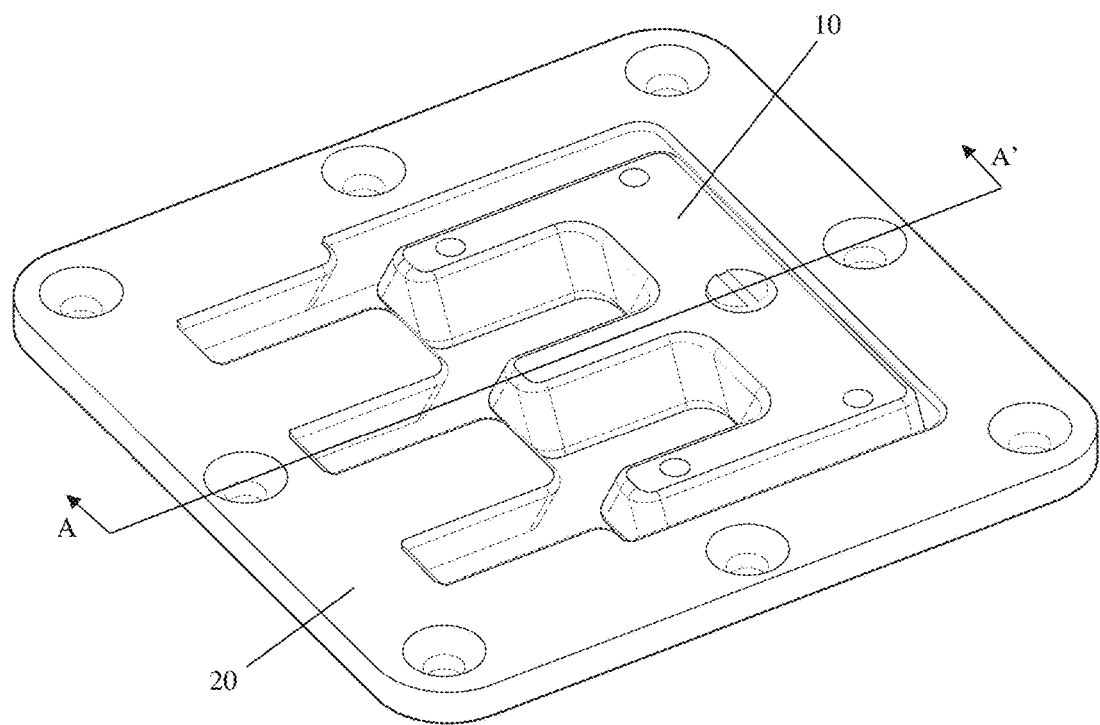
Figure 1C:
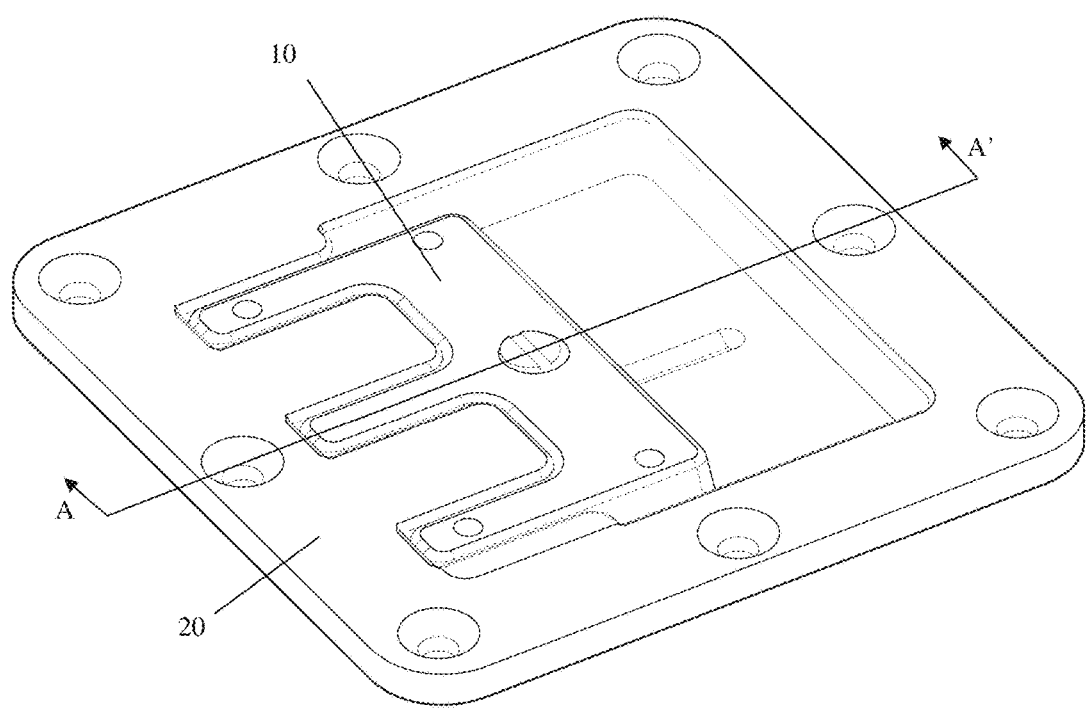
Figure 4A:
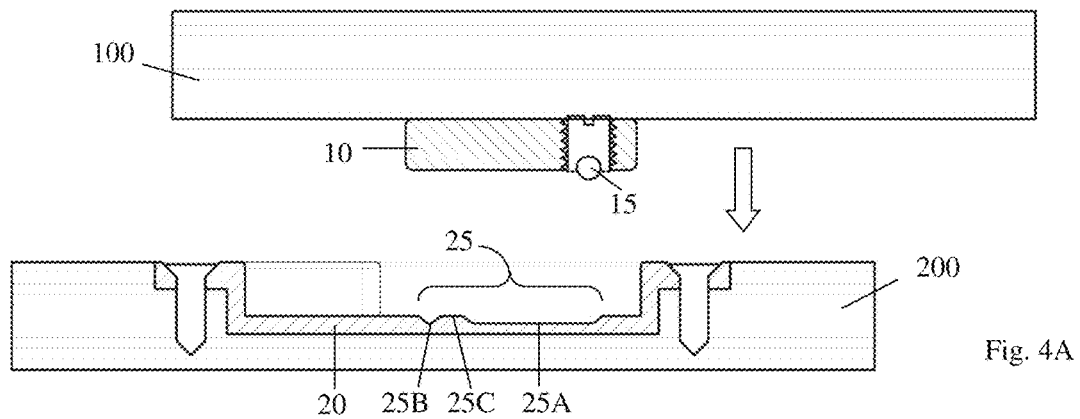
FIGS. 4A-4C are side cross-sectional views of the two hardware pieces of the connector with the furniture modules to be joined.
Figure 4B:
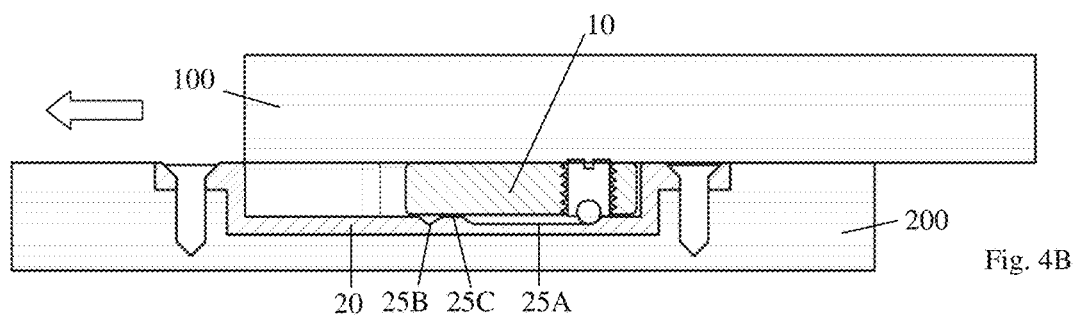
Figure 4C:
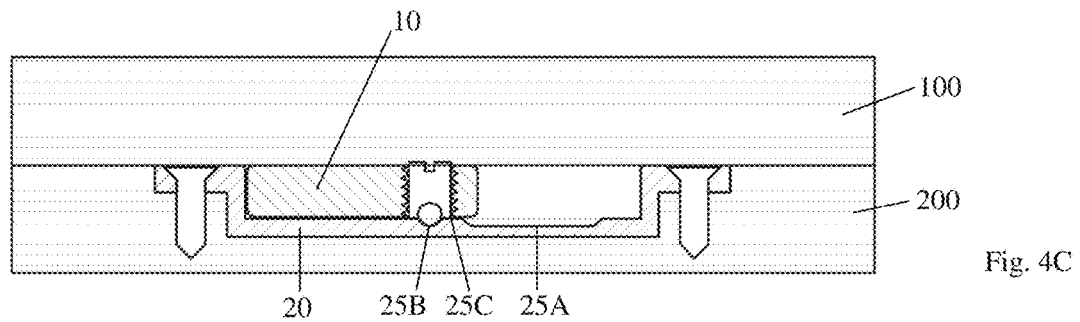

An embodiment of the present invention is described in detail with reference to FIGS. 1A-4C. As shown in FIGS. 1A-1C, the connector hardware includes two pieces 10 and 20. The first piece of hardware 10 is intended to be affixed to and protrude downwardly from the bottom face of the top furniture module, and the second piece of hardware 20 is intended to be affixed to the top of the bottom furniture module. This is also illustrated in FIG. 4A-4C, showing two furniture modules 100 and 200. As shown in FIG. 4A-4C, the second hardware piece 20 is entirely embedded into the top panel of the bottom furniture module 200, so that the top surface of the hardware piece 20 is flush with the top surface of the bottom furniture module. To this end, a cavity is cut into the frame module, preferably having a shape that matches the shape of the second hardware piece 20.

Note that the top and bottom orientations may be reversed; in other words, the second hardware piece 20 may be affixed to the top furniture module and the first hardware piece 10 may be affixed to the bottom furniture module.

Figure 2A:
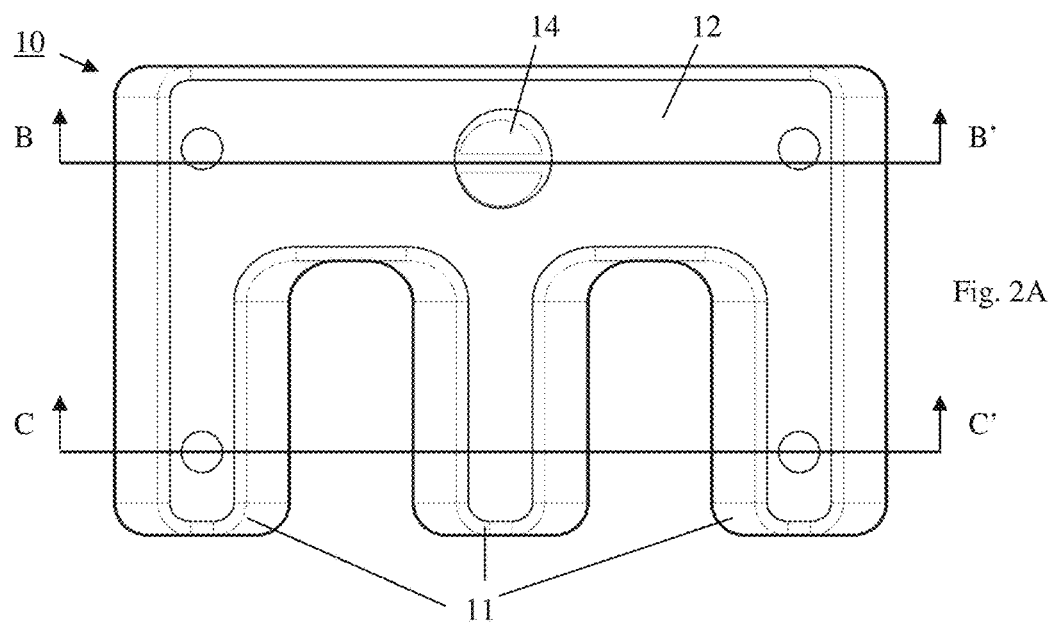
FIGS. 2A-2D illustrate the structure of the first hardware piece of the connector.
Figure 2B:
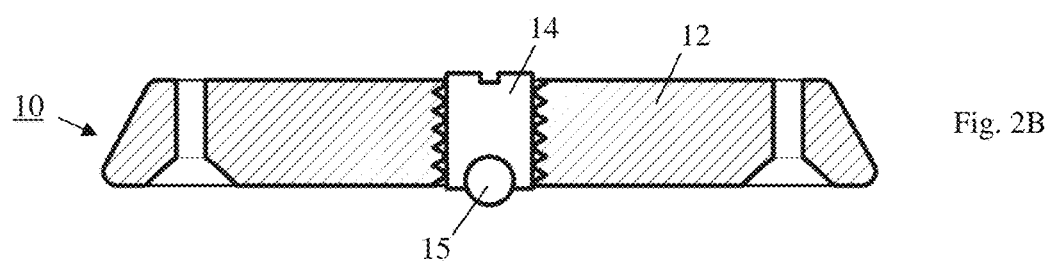
Figure 2C:
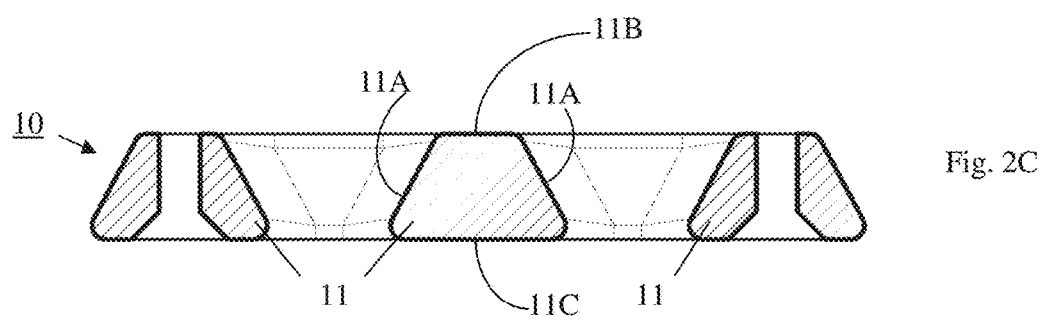
Figure 2D:
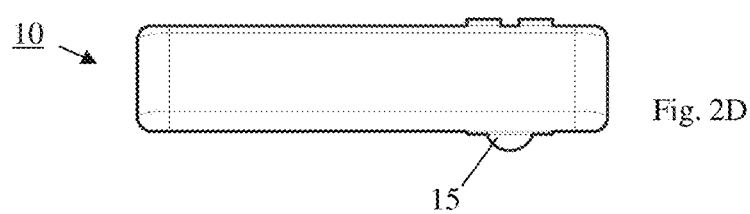

FIGS. 2A-2D illustrate the structure of the first hardware piece 10 (also referred to as the male hardware piece). FIG. 2A is a top plan view; FIGS. 2B and 2C are side cut-away views taken in planes indicated by lines B-B' and C-C' in FIG. 2A, respectively; and FIG. 2D is a side view from the right side of FIG. 2A. In the orientation shown in FIGS. 2B and 2C, the top furniture module is located above the hardware piece 10.

The first hardware piece 10 generally has a flat shape bound between two parallel planes. As shown in FIGS. 1A, 2A and 2C, the first hardware piece 10 has a number of dovetail shaped, elongated prongs (protruding members) 11. Any suitable number of prongs may be used, including one (three are shown in the figures). Each prong 11 has two angled sides 11A. The top face 11B of each prong 11, which will be in contact with the bottom surface of the top furniture module, are narrower than the bottom face 11C; i.e., the dovetail (trapezoidal) shape of the cross-section of the prong is narrower at the location where the prong is in contact with the furniture module. The prongs 11 are joined to a base part 12 of the first hardware piece 10, and extend in parallel with each other from the base part.

As shown in FIGS. 2A, 2B and 2D (see also FIG. 4A), the first hardware piece 10 also has a detent 14/15 facing downward, i.e. facing away from the surface of the furniture module 100 to which the first hardware piece is attached. The detent includes a ball 15 partially protruding from a casing 14, i.e. from the bottom surface (the surface not in contact with the furniture module) of the first hardware piece 10. An internal spring (not shown) disposed in the casing 14 urges the ball outward. The ball 15 may retract into the casing 14 under a force. The biasing force applied by the spring can be of any varying amount to provide different degrees of resistance. As explained later, the ball will fit into a track of the second hardware piece.

FIGS. 3A-3C illustrate the structure of the second hardware piece 20 (also referred to as the female hardware piece). FIG. 3A is a top view, and FIGS. 3B and 3C are side cut-away views taken in planes indicated by lines B-B' and C-C' in FIG. 3A, respectively. In the orientation shown in FIGS. 3B and 3C, the bottom furniture module is located below the hardware piece 20.

The second hardware piece 20 generally has a flat shape bound between two parallel planes. As shown in FIGS. 3A-3C, the second hardware piece 20 has a frame 21; a peripheral area 26 of the frame may form a flange to facilitate mounting of the hardware piece 20 to the furniture module. The frame 21 defines a main cavity 22 as well as a number of dovetail shaped, elongated slots (receiving cavities) 23. Each slot has two angled sidewalls 23A; the dovetail (trapezoidal) shape of the cross-section of the slots 23 is narrower at the top (the side facing away from the furniture module to which the hardware piece 20 is affixed). The slots 23 are separated by elongated protrusions 24 which are also dovetail shaped, being wider at the top. The slots 23 are joined to the main cavity 22, and extend in parallel with each other from the main cavity. Any suitable number of slots may be used, including one (three are shown in the figures). Preferably, the number of slots 23 in the second hardware piece 20 is the same as, or greater than, the number of prongs 11 in the first hardware piece 10.

As shown in FIGS. 1A-1B, the main cavity 22 and slots 23 of the second hardware piece 20 are designed to receive and accommodate the first hardware piece 10. As shown in FIG. 1B, the main cavity 22 of the second hardware piece is sufficiently sized to receive and accommodate the entire first hardware piece 10. The height of the main cavity 22 and slots 23 is approximately the same as the height of the first hardware piece 10, allowing for a suitable tolerance (gap) that should be as small as possible. Thus, when the first hardware piece 10 is received within the main cavity and the slots, the top surfaces of the two hardware pieces 10, 20 are flush with each other.

The cross-sectional shape and size of the slots 23 are approximately the same as the cross-sectional shape and size of the prongs 11, allowing for a suitable tolerance that should be as small as possible. In addition, the distances between the multiple prongs 11 and the distance between the multiple slots 23 are also approximately equal. As a result, the prongs 11 can fit into the slots 23 (see FIG. 1C), and can slide along the slots.

As shown in FIGS. 1A, 3A 3B, the second hardware piece 20 also includes a track or groove 25 formed on the bottom of the main cavity 22 and extending in the same direction as the slots 23, for receiving the ball 15 of the detent of the first hardware piece 10. The track 25 preferably has a depth that is about half of the diameter of the ball 15. The track 25 has at least two parts, 25A and 25B, the first part 25A being an elongated track and the second part 25B being a round indentation aligned with the first part 25A. In the location 25C between the first part 25A and the second part 25B, there may be a shallower track or no track; in other words, the location 25C constitutes a barrier between the two parts 25A and 25B. The barrier 25C has a suitable profile to generate a desired amount of resistance when the ball 15 moves from the track 25A to the round indentation 25B. The three parts 25A, 25B and 25C are aligned in the same line parallel to the direction of the slots 23.

When the first hardware piece 10 is received in the main cavity 22 of the second hardware piece 10 (see FIG. 1B), the ball 15 of the detent is located in the first part 25A of the track, as shown in FIG. 4B. From this state, referred to as the loading/unloading state, the first hardware piece 10 is slideable along the cavity 22 and slots 23 of the second hardware piece 20 to a state (referred to as the locked state, shown in FIG. 1C) where the prongs 11 of the first hardware piece are inserted into the slots 23 of the second hardware piece. During the movement from the loading/unloading state (FIGS. 1B and 4B) to the locked state (FIGS. 1C and 4C), the ball 15 first slides along the first part 25A of the track, then goes over the barrier 25C (shallower track or no track), and falls into the round indentation 25B when the first and second hardware pieces 10, 20 are in the locked state. The ball 15 retracts when it goes over the barrier section 25C.

The detent may be located at other alternative locations. For example, one or more detents may be located on side walls of the first hardware piece 10, including the side walls of the prongs 11, and corresponding one or more tracks may be located on side walls of the second hardware piece 20, including the side walls of the slots 23. Multiple detents and multiple corresponding tracks may be provided. Preferably, the barrier portion of each track should be positioned so that they are encountered at the same point of travel of the first hardware piece 20.

Alternatively, the detent may be provided on the second hardware piece 20 and the track may be provided on the first hardware piece 10.

In another alternative, the detent may be built as a part of the first hardware piece 10 using flexible plastic on the middle prong 11 to simulate the spring. The prong may be changed from its current trapezoidal shape to a plastic prong that is flexible at its base with a semi sphere at the end (to simulate the ball) and the appropriate indentations; the protrusions 24 on the hardware piece 20 function to secure a final locked position to create an equivalent to track 25. Such a modification made to the first hardware piece 10 can be made to work with the track that is shown in the FIG. 3A as well, without making any adjustments to the second hardware piece 20.

Detents are well known; while some examples are described above, any type of detent may be used, including those employing spiral springs or flexible plates. As used in this disclosure, the term detent mechanism broadly refers to a device for positioning and holding one mechanical part in relation to another in a manner such that the device can be released by force applied to one of the parts. In the locked state, the detent mechanism resists relative movement of the two furniture modules when an insufficient force is applied, and allows for relative movement when a sufficient force is applied but without requiring a manual trigger or release and without requiring the use of a tool. The detent mechanism includes two parts that engage with and cooperate with each other, one part being mounted on the first furniture module, the other part being mounted on the second furniture module. In the illustrated embodiment, the first part of the detent mechanism is a spring loaded ball 15 and the second part of the detent mechanism is the track 25, which engage with and cooperate with each other to hold the two furniture modules in the locked state.

The movement of the first and second hardware pieces 10, 20 described above is also shown in FIGS. 4A-4C. The hardware pieces 10 and 20 are shown in a side cross-sectional view in a plane as indicated by line A-A' in FIGS. 1A, 1B and 1C. FIGS. 4A-4C also show the top and bottom furniture modules 100 and 200, respectively, to which the hardware pieces 10 and 20 are respectively attached, e.g. by screws. The side profile of the track 25, including the first part 25A, second part 25B and the barrier portion 25C, is also illustrated. FIGS. 4A-4C generally correspond to FIGS. 1A-1C.

The use of the connector set is described with reference to FIGS. 1A-1C and 4A-4C.

In the unassembled state, shown in FIGS. 1A and 4A, the first and second hardware pieces 10 and 20 are respectfully mounted on the first and second furniture modules 100 and 200. Then, the user places the top furniture module 100 on top of the bottom furniture module 200 (as schematically shown by the arrow in FIG. 4A). The two furniture modules are aligned such that the first hardware piece 10 is received in the cavity 22 of the second hardware piece 20, as shown in FIGS. 1B and 4B, where the two hardware pieces are in the loading/unloading state. Preferably, in the loading/unloading state, the two furniture modules 100 and 200 are stable, i.e. the top furniture module 100 can balance over the bottom furniture module 200 without outside assistance. In the loading/unloading state, the ball 15 of the detent on the first hardware piece 10 is positioned in the first part 25A of the track 25 of the second hardware piece 20.

Then, the user pushes the top furniture module along the direction of the prongs 11 and the slots 23, which is also parallel to the direction of the track 25, as schematically shown by the arrow in FIG. 4B. For convenience, this direction, i.e. the direction of movement of the first hardware piece 10 in the transition from the loading/unloading state to the locked state, is referred to as the transition-locking direction. As a result, the prongs 11 are inserted into the slots 23, as shown in FIGS. 1C and 4C, and the ball 15 falls into the round indentation 25B in the locked state. Toward the end of the transition, when the ball 15 reaches the end of the first part 25A of the track, extra force is required to push the top module 100 so that the ball 15 moves over the barrier 25C and falls into the round indentation 25B. The two hardware pieces 10, 20 are now locked together, as will be explained in more detail below.

The transition-locking direction can be a front to back, back to front, left to right, or right to left motion from the user's perspective, depending on the design of the furniture modules.

In the locked state, the unit formed by the two furniture modules 100 and 200 is stable and secure, and sturdy against forces of normal use. Preferably, they are stable against upward forces, e.g., when the top furniture module 100 is picked up, the bottom furniture module 200 can be lifted as well due to the connection formed by the two hardware pieces 10 and 20. More specifically, the dovetailed slots 23 and prongs 11 can hold the two hardware pieces together against a separating force in the vertical direction, and thereby holding the two furniture modules together. As mentioned earlier, the hardware pieces 10 and 20 are securely affixed to the furniture modules 100, 200, e.g. by screws. The furniture unit is also stable against downward forces on the top module, as the two furniture pieces are directly pressed against each other.

Preferably, the furniture unit is stable against lateral forces applied to the top or bottom furniture modules during normal use. In the lateral direction perpendicular to the transition-locking direction, the hardware pieces 10 and 20 prevent any movement because the prongs 11 and are pressed against the side walls 23A of the slots 23. In the direction opposite the transition-locking direction, referred to as the transition-unlocking direction, the top module 100 is stable against movements as long as the lateral force is less than that required to move the ball 15 out of the indentation 25B over the barrier 25C. In the transition-locking direction, movement may be restrained by the configuration of the prongs 11 and slots 23. For example, the ends of the prongs 11 may press against the end walls of the slots 23 when the prongs are longer than or of equal length as the slots; or the ends of the protrusions 24 may press against the base 12 when the slots 23 are longer than or of equal length as the prongs 11. Alternatively, if in the locked state the movement is restrained by the configuration of the prongs 11 and slots 23 in the above-described manner, the top furniture module 100 is still stable against movements in the transition-locking direction as long as the lateral force is less than that required to move the ball 15 out of the indentation 25B.

When the two furniture modules 100 and 200 are assembled, they two modules are in contact with each other, and the hardware pieces 10 and 20 are essentially invisible from the outside. In addition, the two furniture modules are aligned as desired, for example, when the two modules are of the same size, the four sides of one module are flush with the corresponding sides of the connected module.

To disassemble the furniture unit, a sufficient force is applied to the top furniture module 100 in the transition-unlocking direction. As a result, the ball 15 is pushed out of the indentation 25B (by momentarily retracting into the casing of the detent), and goes over the barrier 25C to enter the track 25A, and moves along the track 25A. When the first and second hardware pieces 10 and 20 are in the loading/unloading state, the top furniture module 100 may be picked up and separated from the bottom furniture module 200.

As can be seen from the above descriptions, once the hardware pieces of the connector are mounted onto the respective furniture modules, the furniture modules can be assembled and disassembled without using any tools.

The hardware pieces 10 and 20 may be formed of plastic or other suitable materials, including hard metals. Preferably, the material is a hard material that does not change shape over time or due to temperature change, does not get chipped or worn down easily when repeatedly sliding against other pieces of the same material. It should also be hard enough to not snap as a result of movement of the furniture unit consisting of several modules as a whole.

The hardware pieces are formed separately from the furniture modules, and are mounted onto the furniture modules. In one preferred embodiment the screws for attaching the female and the male hardware pieces are 5⅝" #10 and 4¾" #6 screws, respectively. The number of screws is four and eight for the female and the male hardware pieces, respectively. Providing hardware pieces separately from the furniture modules is an advantage to establishing unified standards for modular furniture systems.

FIGS. 1A-1C and 4A-4C show one set of the connector hardware (including the male hardware piece and the female hardware piece), but two or more sets of the connector hardware may be provided to join two furniture modules together. Each furniture module may include one or more male hardware pieces or one or more female hardware pieces or both.

For example, multiple hardware pieces (male and/or female) may be provided on one surface of one furniture module, and the same number of hardware pieces of the opposite type may be provided on one surface of another furniture module, at corresponding locations according to how the two furniture modules are intended to be arranged in the furniture unit. This increases the strength of the connectors, making it more secure to join large or heavy modules together. It also enables the user to fit two or more smaller (less wide) units over one wider unit or vice versa. In one particular example, multiple hardware pieces are mounted at about 5" or 6" apart (other distances may be used as well).

In addition, each furniture module may include two or more hardware pieces (male and/or female) for joining to two or more other furniture modules. For example, a furniture module may have two hardware pieces on its bottom surface for connecting with another furniture module under it, and two hardware pieces on its top surface for connecting with yet another furniture module above it, forming a three-module unit; this may be repeated to form larger units.

Although in the illustrated embodiments the furniture modules are arranged vertically, one on top of another, the connectors can also be used to join furniture modules that are arranged side by side horizontally.

The connectors can be used to design modular furniture where the user can combine different modules in different customized configurations based on the user's need. For example, for a line of furniture modules, the distance between multiple hardware pieces on each module may be designed to be a constant, in order to increase the flexibility in the arrangements of different modules. Preferably, some surfaces of furniture modules have cavities pre-formed into them to accommodate the female hardware piece 20, and holes pre-drilled into them for screws for attaching the hardware pieces. The pre-formed cavities and holes help to correctly position and align the hardware pieces. In lieu of or in addition to pre-formed holes, markers may be used to help the user position the hardware pieces.

In the embodiments shown in FIGS. 1A-1C, 2A and 2C, the number of prongs 11 in the male hardware piece 10 is equal to the number of slots 23 in the female hardware piece 20. In alternative embodiments, the number of slots 23 in the female hardware piece 20 may be more than the number of prongs 11 in the male hardware piece 10. The set of prongs 11 can fit into any subset of adjoining slots 23, allowing the male hardware piece to be locked into different locking positions within the female hardware piece that are laterally displaced from each other. Multiple tracks 25 should be provided for each locking position. For example, if the male hardware piece has three prongs and the female hardware piece has five slots, there will be three different locking positions, and three different tracks should be provided. This design allows for adjustment of the relative positions of furniture modules, or adjustment of distances between connector pieces, without using more hardware pieces. This can allow more customizability and possibility to accommodate more possibilities for widths and depths of modules to fit into the system.

Although in the illustrated embodiment the height of the main cavity 21 of the second hardware piece 20 is identical to the thickness of the first hardware piece 10, the height of the main cavity may be larger than the thickness of the first hardware piece. In this situation, the detent including the ball 15 and the track 25 may be located on side walls of the first hardware piece 10 and the main cavity or slots of the second hardware piece.

Figure 5:
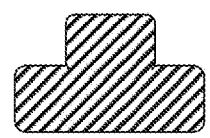
FIG. 5 schematically illustrates the cross-sectional shape of the prongs of the first hardware piece according to an alternative embodiment of the present invention.

In an alternative embodiment, the prongs 11 of the first hardware piece have a step-shaped cross section, as shown in FIG. 5, rather than a trapezoidal shape. The slots 23 of the second hardware piece have a matching cross-sectional shape. Other cross-sectional shapes may be used, as long as the top side of the cross-section is narrower than a middle portion of the cross-section, such that the prongs cannot fall out of the slots through the top opening of the slots. This way, when forces are applied to the first and second hardware pieces in the vertical direction, the prongs and the slots will remain engaged with each other without separating.

In another alternative embodiment, each slot 23 of the second hardware piece 20 is replaced by a tunnel. Unlike the slots 23, the tunnel has a closed top. The first hardware piece 10 is modified correspondingly, so that the prongs 11 have a smaller height than the base 12. In the locked state, the prongs 11 are inserted into the tunnels.

The connectors can be provided separately from the furniture modules. As mentioned earlier, the furniture modules may have cavities or markers pre-formed on them to facilitate the attachment of the connectors to the furniture module, but this is optional.

By providing the connector hardware separately of the furniture modules, the furniture modules may have more cavities or markers pre-formed on them as they have sets of connectors to provide even more permutations for customization and compatibility with other modules. Each of the multiple connectors can operate independently without interfering with the full functioning of other connectors. Because of this, it also makes available the possibilities of various apparatuses to work within the cavities or markers to have a more continuous spectrum of flexibility in terms of the spacing between connectors, instead of set multiples such as 5" or 6" as mentioned earlier.

Connectors according to embodiments of the present invention allow for a modular furniture system and simplify the connection process between two modules of furniture. The hardware seeks to provide a simple, inexpensive, straightforward and easy to understand/use system for consumers to rebuild furniture. The connector hardware is invisible in the assembled furniture units. The system is tool-free to operate once the connectors are mounted onto the furniture module, easy to learn, stable to move as one unit when assembled, and safe from outside force resulting from typical human interactions in all directions. It accommodates full-weight furniture designs made of a wide variety of materials, accommodates nearly any existing modern design with minimal design integrity compromise, provides all the functions of modularity, including customizability of functions, geometric patterns, color, design motifs, etc., without foregoing the form and function of traditional furniture and is not permanently affixed to the frame of the furniture at the time of manufacture to provide for more flexibility in manufacturing. The system can accommodate designs of all kinds of various different functionalities and aesthetics.

The applications of the connectors are not limited to modules of furniture; they can be used to joint other objects as well, such as planters, appliances, etc.

Second Embodiment

The second embodiment of the present invention focuses on the part of the structure that is considered the track (25)

and its components (25A, 25B, 25C) from the first embodiment. The track and its interaction with the detent mechanism include the main features that influence a user's interactional experience with the furniture modules and the pair of hardware pieces used to connect them. The track and the corresponding detent mechanism design is used to define the user's range of possible movements and the user's sensory feel while utilizing the hardware described in the first embodiment. Because the hardware is embedded between 2 furniture modules in its most common intended use case and out of the user's sight during its operation, it is important to create and define a specific feel for the user to rely on to know what the hardware is doing. The track and corresponding detent mechanism design can create specific sequences of tactile feel(s) and auditory signal(s) to allow the user to better know what's going on with the hardware during its operation. The varying sets of tactile feels and auditory signals are also useful in directing the user in an intuitive way to properly control and navigate the features of the hardware as there is increasing functionality and complexity built into the hardware design in more advanced implementations. The design considerations of the track and its interaction with the detent mechanism may also aid in eliminating issues that arise during manufacturing and during functional use of the modular furniture it is meant to enable.

The track is defined as a sequence of 3 or more features that define the interaction of one piece of hardware with a separate piece of hardware in a specific, identifiable way. Each of the features within the track exists with its own independent set of design considerations.

There may exist a series of tracks designed relative to one another to form a system of tracks that define interaction of one piece of hardware with a separate piece of hardware in a series of specific, identifiable ways to guide the user through a system that provides multiple sets of intended functions.

The track feature, as named in the first embodiment, consists of a first elongated indentation, an aligned second indentation separated by a barrier. This continuation introduces a directed pathway feature that consists of a first barrier that is connected to a second barrier by an indentation/cavity.

The second embodiment and its variations are described below with reference to FIGS. 6-17.

Figure 11A:
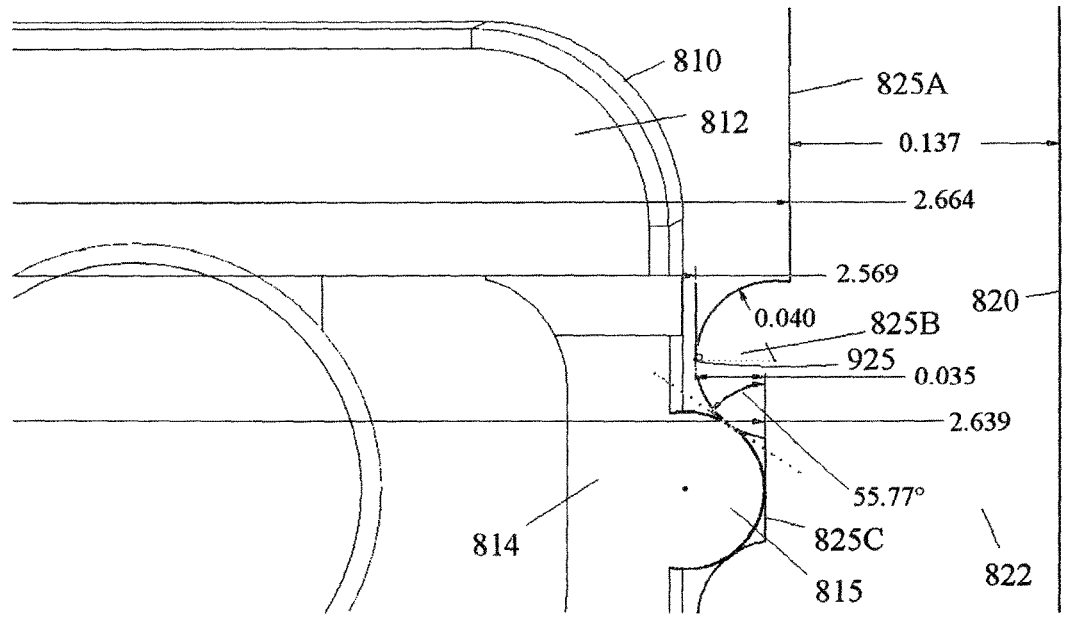
FIGS. 11A-B are detailed top views of both hardware pieces of the second embodiment at the location of the track with different dimensions.
Figure 11B:
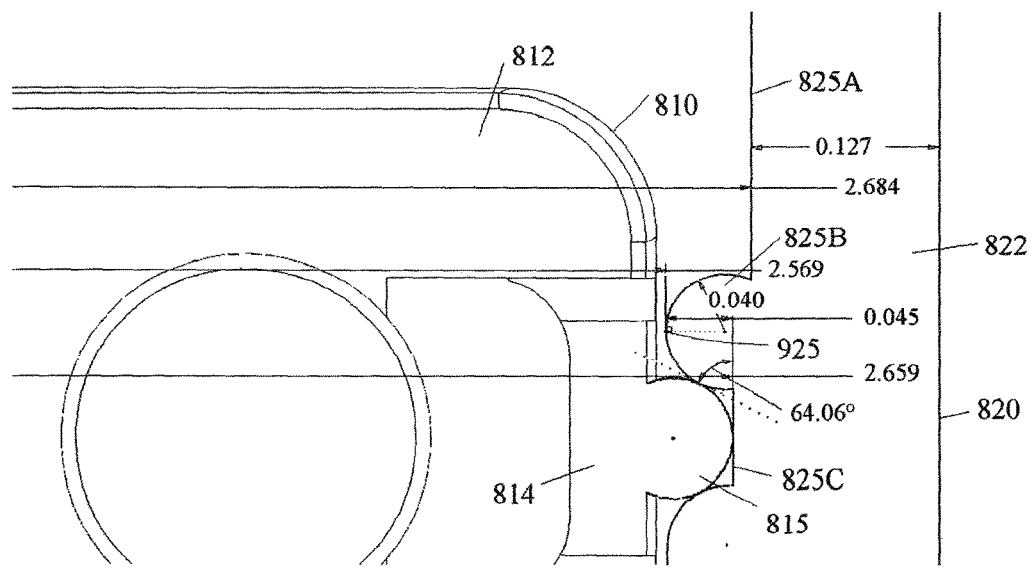
Figure 14:
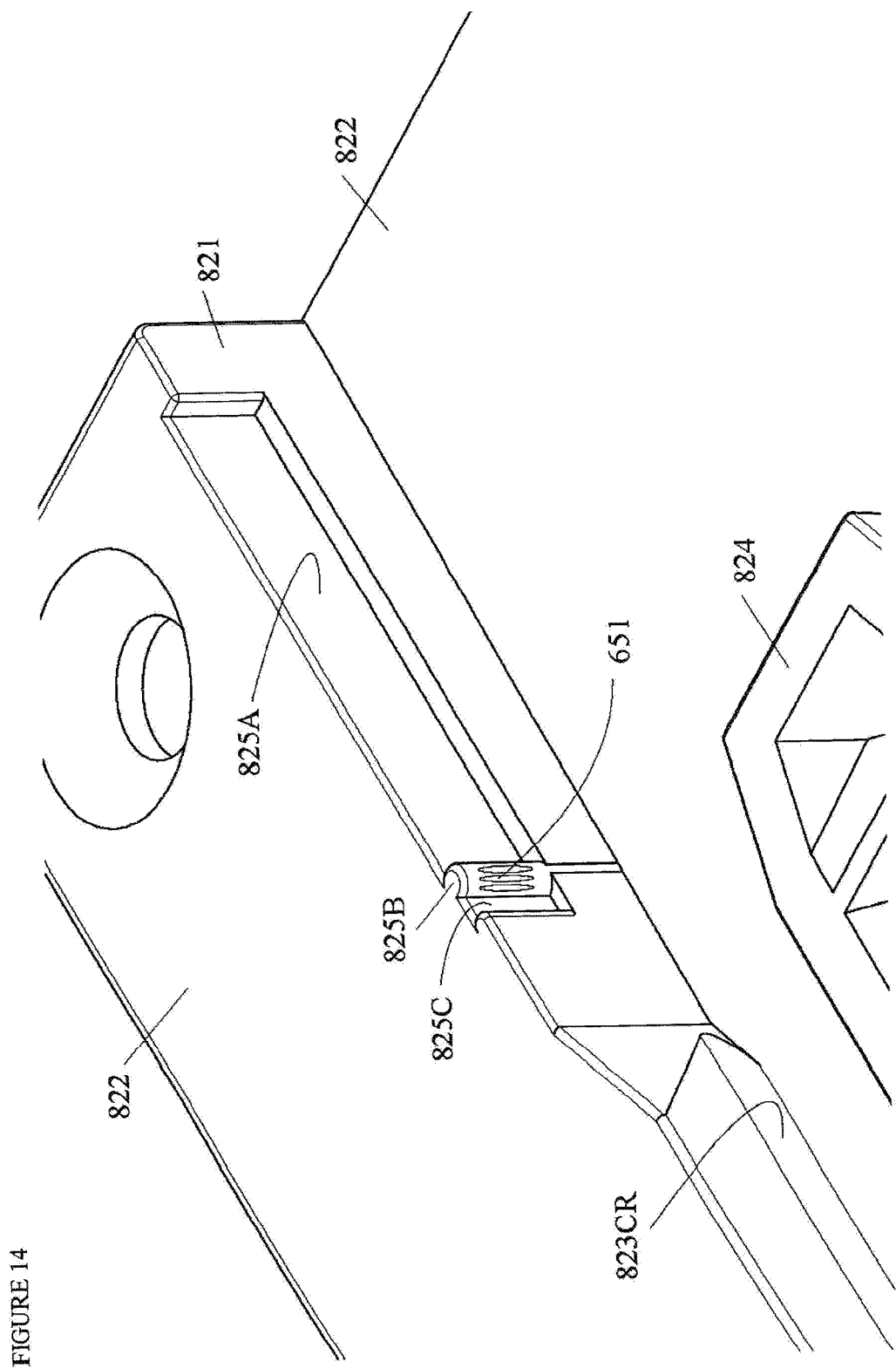
FIG. 14 is a perspective view of an alternative embodiment of the plate shaped piece that has a different design of track features.
Figure 15:
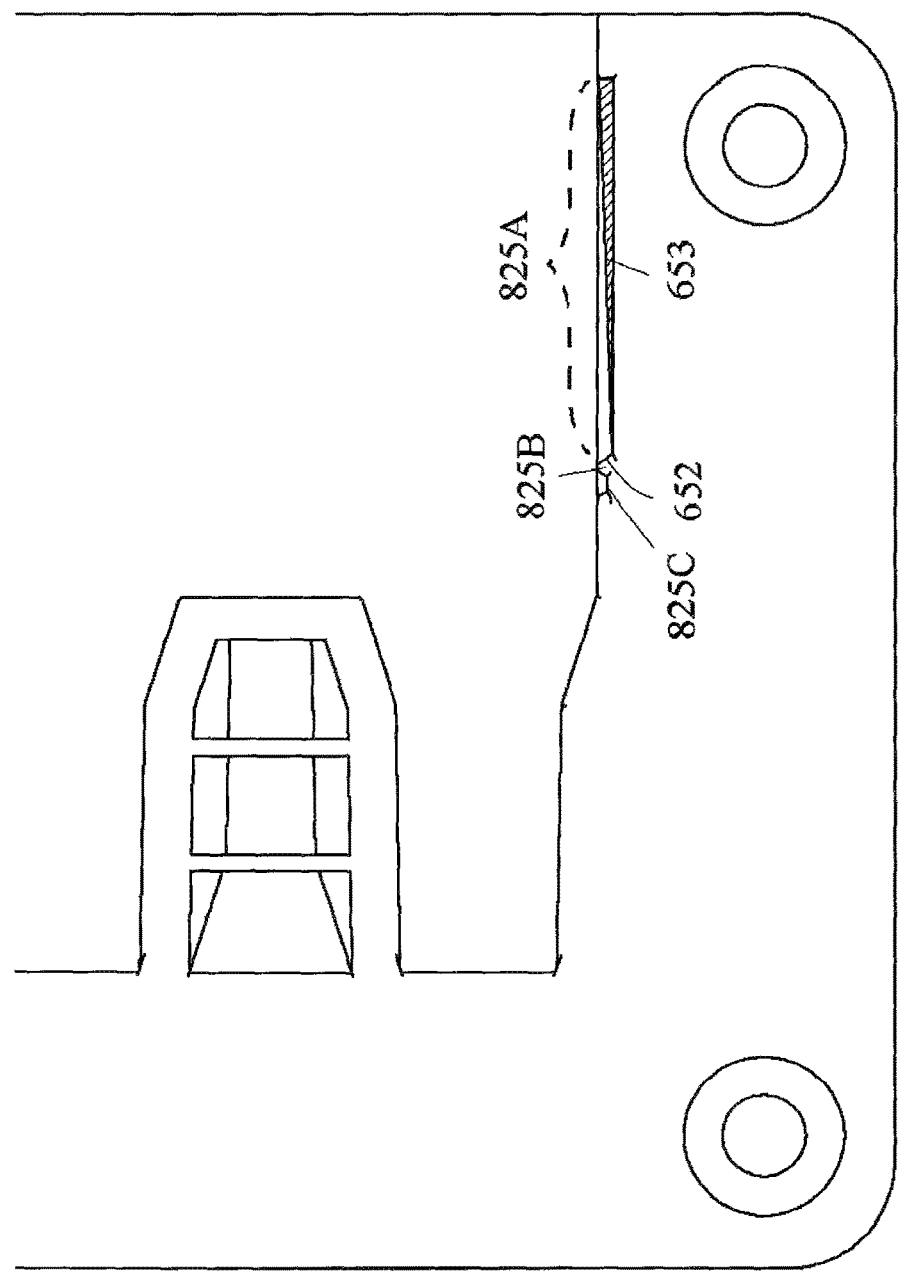
FIG. 15 is an overhead view of an alternative embodiment of the plate that features a different design of track features.
Figure 17:
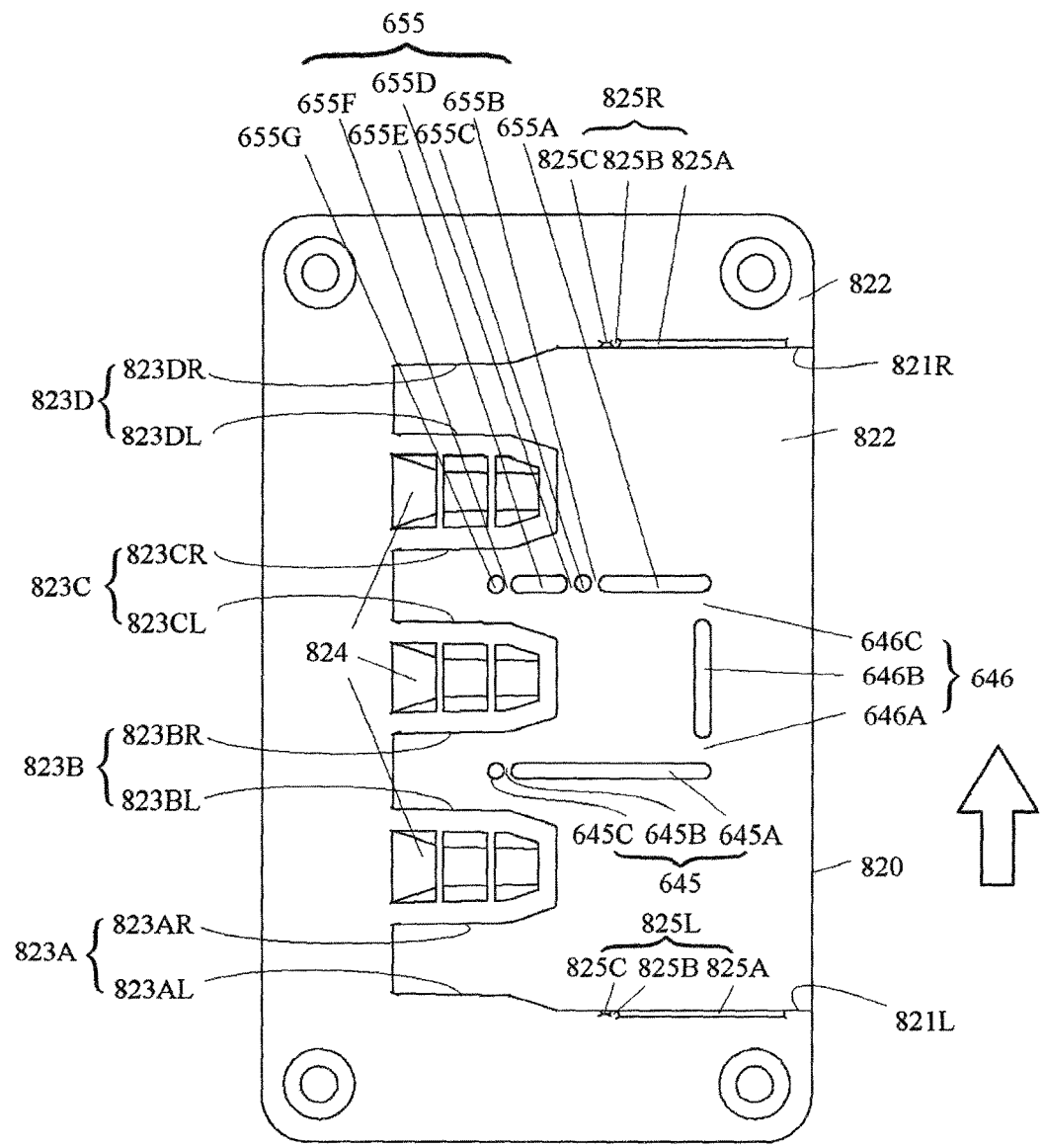
FIG. 17 is an overhead view of an alternative embodiment that has a system of tracks and directed paths.

The part naming convention in these figures is the same as or similar to that for the first embodiment, with the addition of an 8 in front of the corresponding part number from the first embodiment. In FIGS. 11A and 11B, the addition of a 9 is used. In FIGS. 14, 15, and 17, the addition of a 6 is used.

Figure 6:
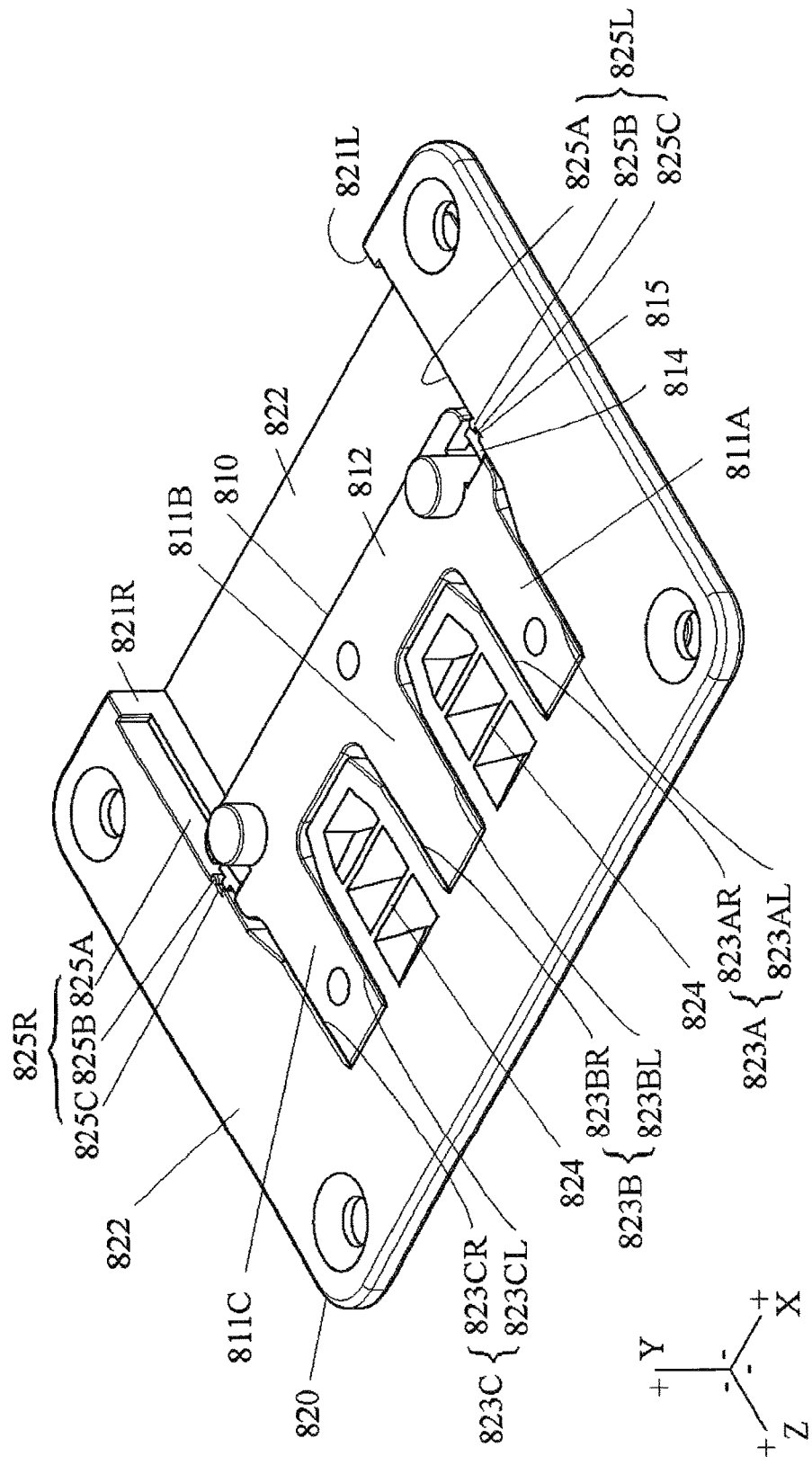
FIG. 6 is a perspective view of the two hardware pieces, the plate shape piece and the E shaped piece, according to a second embodiment of the present invention.
Figure 7:
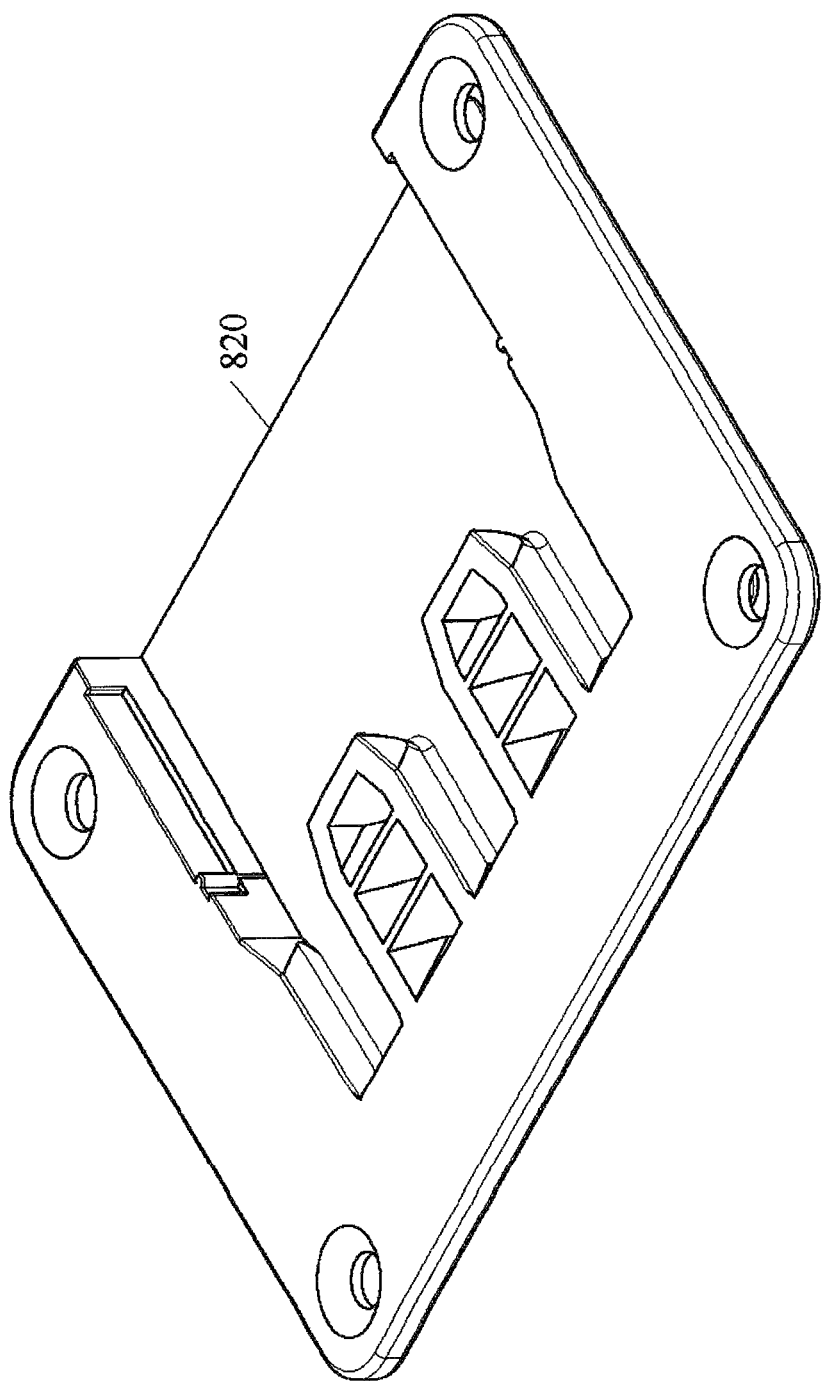
FIG. 7 is a perspective view of the plate shaped piece of the second embodiment.

In the embodiment shown in FIG. 6, the tracks (825L and 825R), consisting of parts 825A, 825B, and 825C (functionally similar to part 25A, 25C, and 25B, of the first embodiment) are shown against the side walls (821L and 821R) of the plate (820). In the first embodiment, the track (25) exists on the bottom surface of the plate (22). There are 2 tracks (825R and 825L) and 2 sets of a track's components (825A, 825B, and 825C) on the plate shaped piece (820) in the embodiment shown in FIG. 6. There is one track on each wall, 821L and 821R. Similarly, there are 2 spring based detent members (814L, 815L, 814R, 815R) on the E shaped piece (810), as shown with detail in FIG. 8. The advantages of having 2 sets as opposed to 1 set is that the spring force that concentrates at the 2 protrusions (815 L, and 815 R) that pushes up against the side walls (821 L and 821 R) naturally centers the E shaped piece as a whole (810) relative to the plate shaped piece as a whole (820). This is helpful to eliminate the effects of imperfections and asymmetry that may occur during manufacturing.

Figure 8:
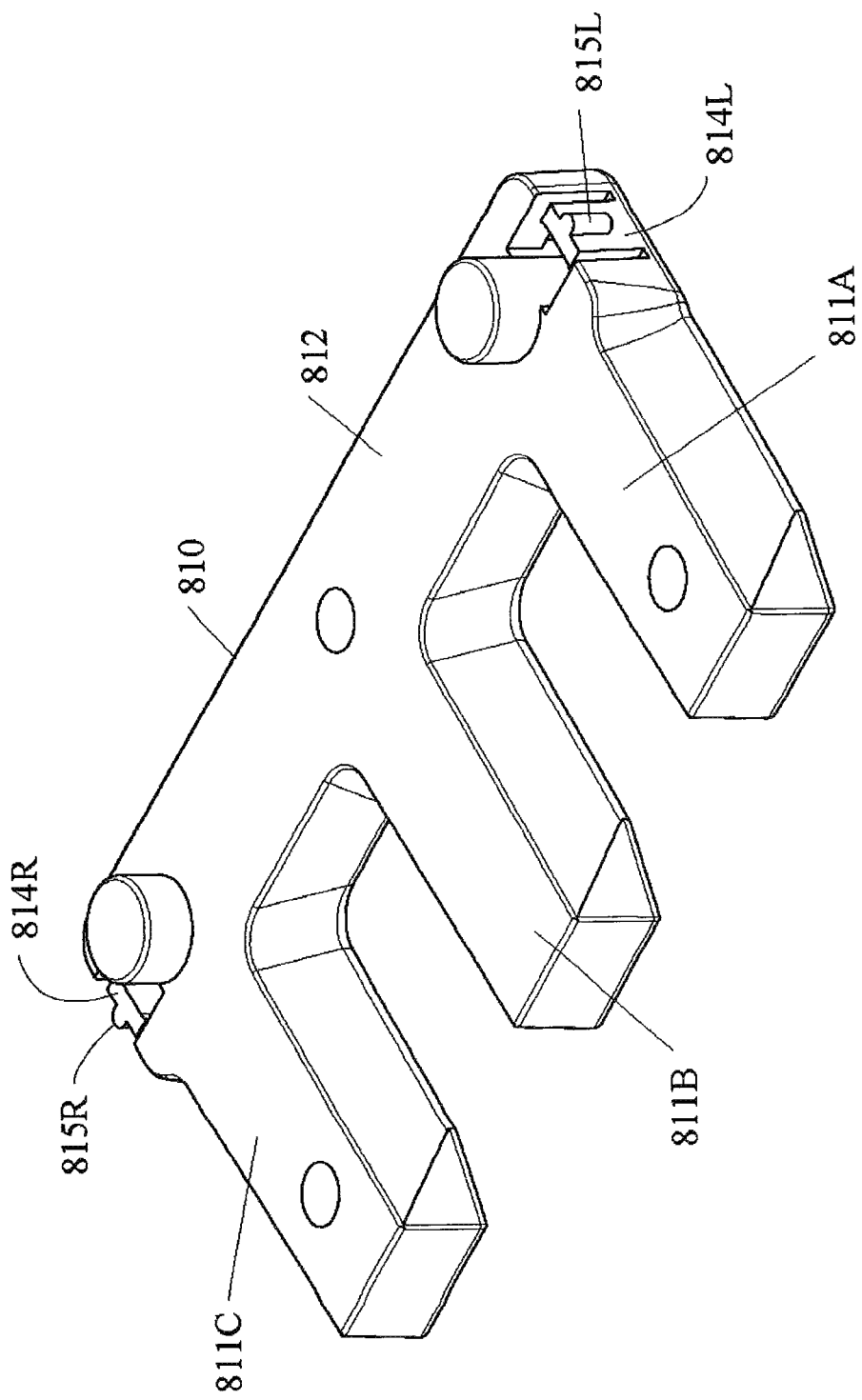
FIG. 8 is a perspective view of the E shaped piece of the second embodiment.
Figure 10A:
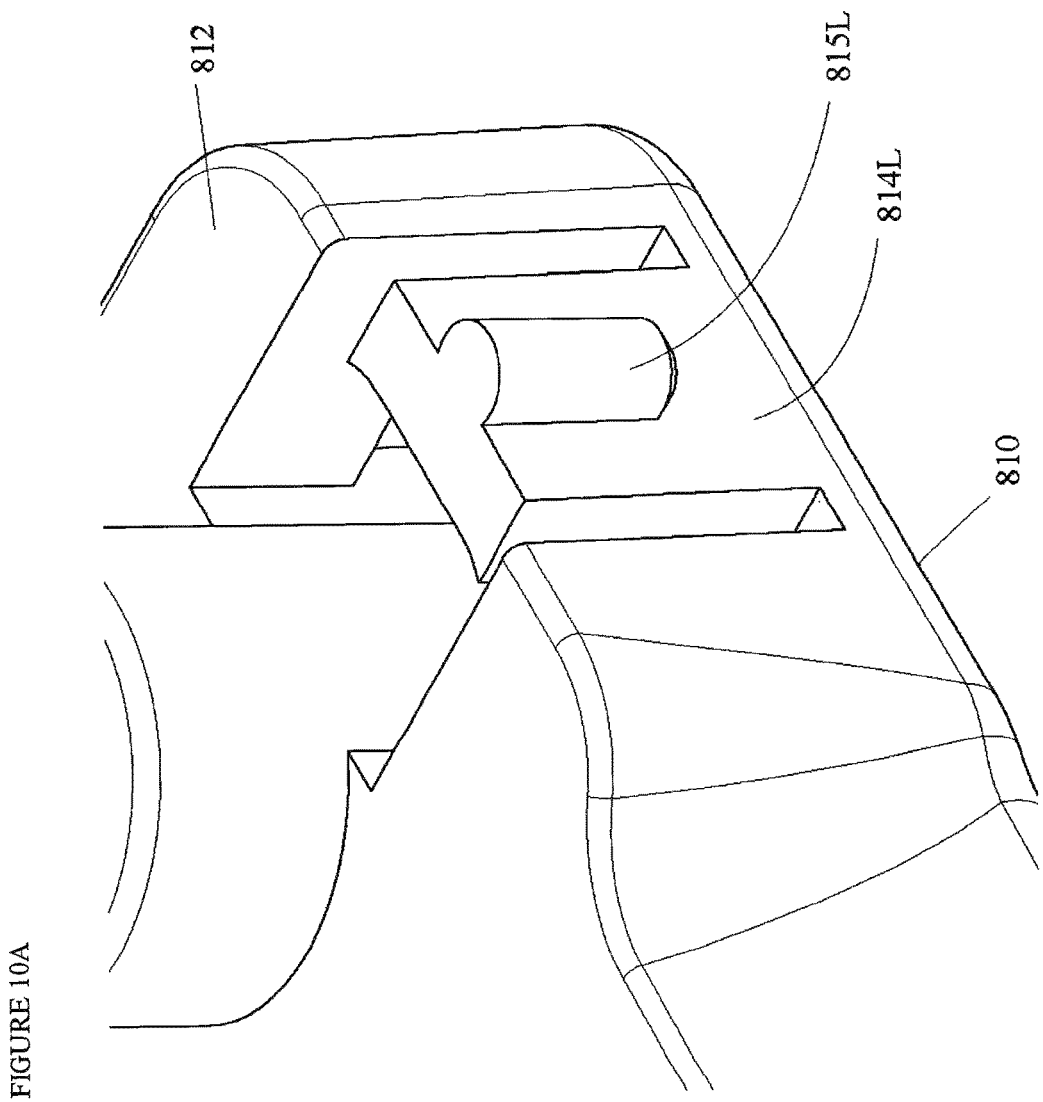
FIGS. 10A-B are detailed views of the detent mechanism feature of the second embodiment, where
Figure 10B:
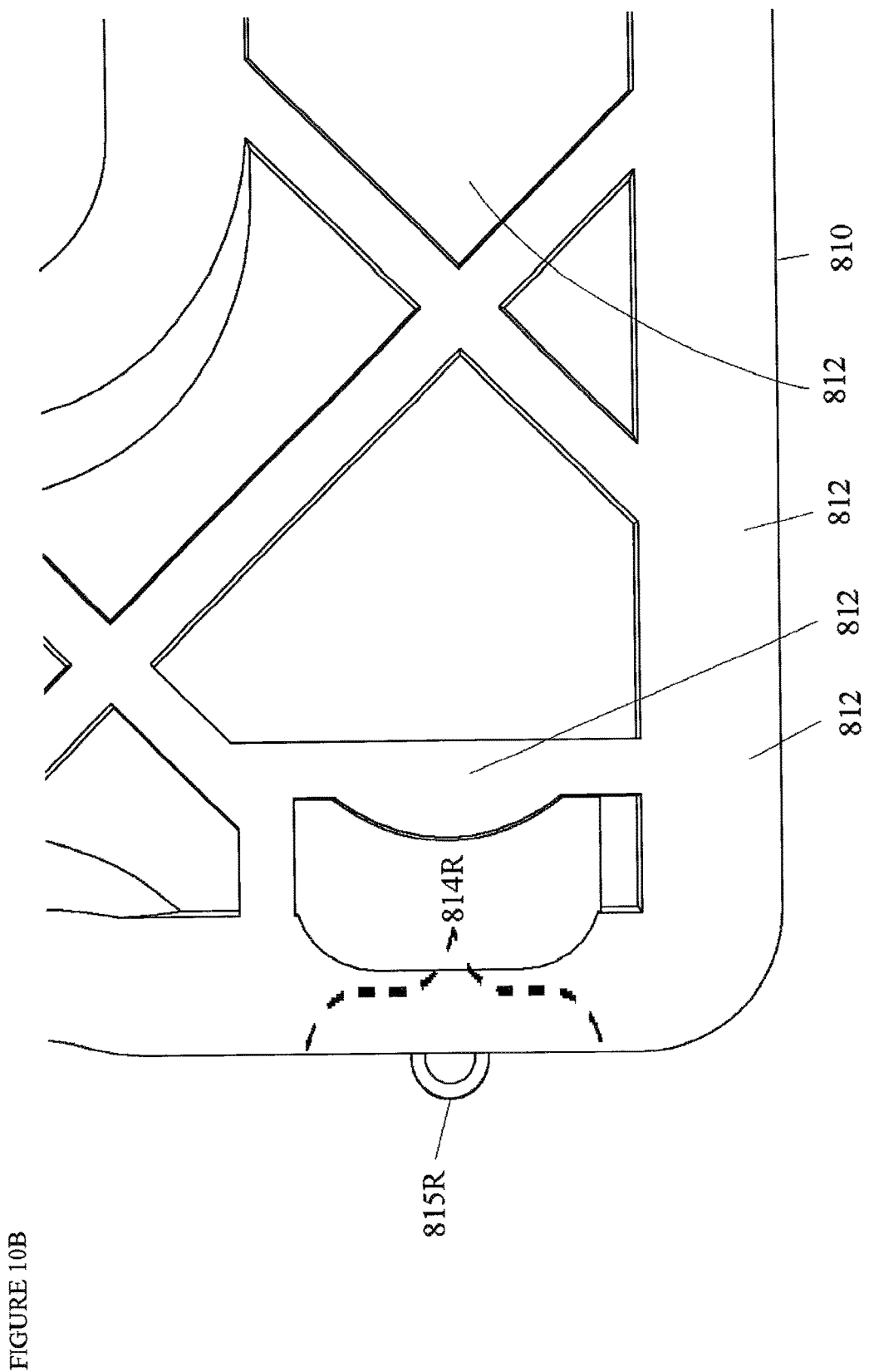

As shown in FIGS. 6, 8, and 10A, protrusion (815, i.e. 815L or 815R) is cylindrical shaped, of a size between a semi-cylinder and a cylinder. It protrudes from a thin wall (814, i.e. 814L or 814R) in the direction of the X axis away from the body (812) of the E shaped piece (810). Together, the thin wall (814) and the protrusion (815), form the detent member of the E shaped piece (810). This detent member comprising of the thin wall (814) and protrusion (815) serves the equivalent function of the spring (14) and ball (15) in the first embodiment. The thin wall (814) is flexible when force is applied to the protrusion (815) in the X direction. As shown with detail in FIG. 10B, the thickness of the base of the thin wall (814) determines how flexible the thin wall (814) and the protrusion (815) are as a unit and thus defines how much force is required to activate the spring effect. The choice of material also determines the mechanical properties of the detent member, as will be described in more detail later. As illustrated in FIGS. 6, 8, and 10A, the spring based detent member (814L, 815L, 814R, 815R) of the E shaped piece (810) is built into the structural body of the E shaped piece (812). This contrasts with the E shaped piece (10) shown in the first embodiment, as illustrated in FIG. 2 of the first embodiment, which has the detent member shown as an outside insert (14, 15).

In alternate embodiments, the protrusion (815) does not have to exist as a cylinder. Instead of having a partially circular shape on the XZ plane, it may have a quadrilateral, pentagonal, hexagonal or other shapes than a partial circle. Instead of existing along a thin wall (814), it may protrude directly from the main body (812) of the E shaped piece (810). By having a pentagonal shape, one of the 5 sides can define the activation force required to push past the bump/barrier of 825B towards the final position at the indentation of 825C and an adjacent side may define a separate activation force required to push past the bump/barrier of 825B from the final position at indentation 825C towards indentation 825A. The protrusion (815) does not have to be of a singular shape. It may be of a combination of shapes. For example, a pentagonal shape with one of the sides as circular. It may also exist as irregular geometries (i.e. jagged lines).

Figure 9B:
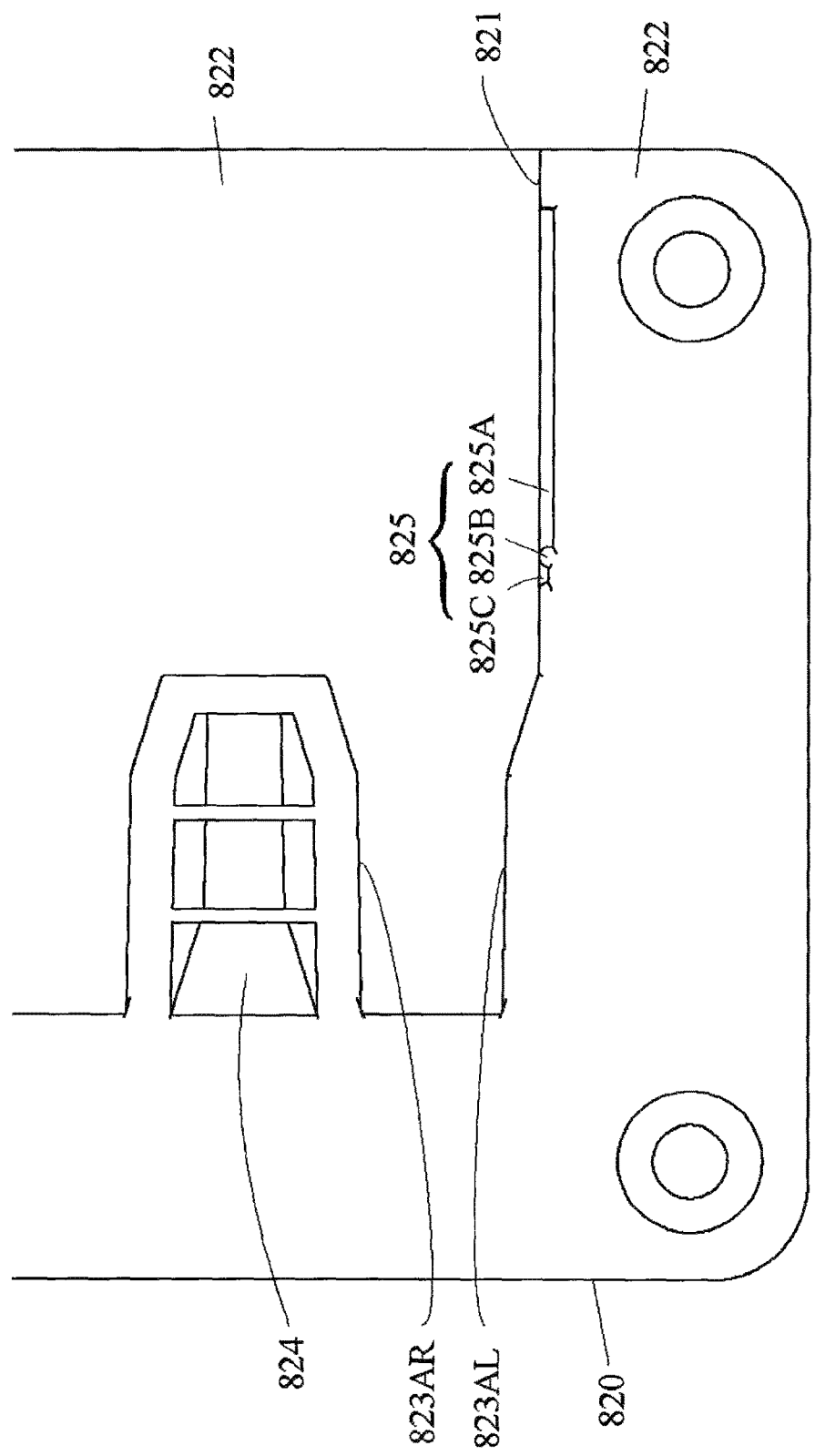
Figure 9C:
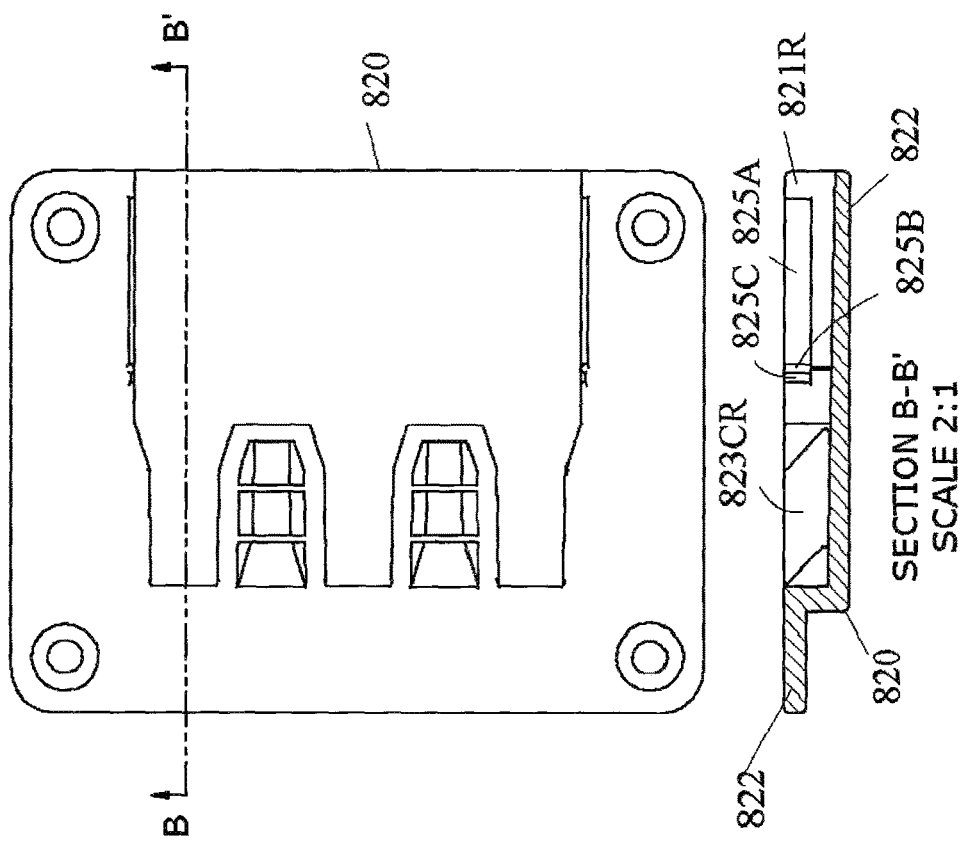

As shown in FIG. 9A, 825A is a cavity/indentation within sidewall (821). As shown in FIG. 11A, in this embodiment, the cavity is deeper than the protrusion of 815.

In other embodiments, like the one shown in FIG. 15, the cavity (825A) may have varying depths. It may be shallower than the protrusion of 815 and force 815 to consistently flex inward as the E shaped piece (810) moves along the Z axis in the + direction. The cavity of 825A may be of the same depth as the protrusion of 815 to restrict the movement of the E shaped piece (810) along the X axis to only when the spring is activated. As shown in FIG. 15, the cavity (825A) may also exist at varying depths as a sloped plane (653). By having a sloped plane (653) that changes in depth, it may create an effect that gradually pushes more and more against the detent mechanism as it moves in a given direction. This is useful to make sure that movement toward either the locked position or the unlocked position is non-accidental. It is also useful to ensure that the user won't stop the activation of the detent mechanism before it reaches barrier 825B, or barrier ceiling 827.

As shown in FIGS. 6 and 9A, feature 825B is a bump in the shape of a cylinder that protrudes from the wall (821). Feature 825B creates a barrier for the protrusion (815) of the E shaped piece (810) when it traverses along the Z axis. Along the Z axis, feature 825B starts where indentation 825A ends and where indentation 825C starts, as shown in detail in FIG. 9A.

It is important to note that in other embodiments, the bump/barrier (825B) doesn't have to exist in the shape of a cylinder. It can take the shape of a flat plane, an angular plane, a precise semi cylinder, or any combination of shapes. As shown in FIG. 15, the shape of this specific embodiment of the bump/barrier (825B) is a combination of shapes (652). Barrier 652 is an angular plane on the side adjacent to 825A and it is a partial cylinder on the side adjacent to 825C. The surface of the shape may be smooth (as it is shown in the figures) or it may consist of bumps (as shown in FIG. 14) or a combination of smooth and bumpy surfaces in other possible embodiments. A bumpy surface similar to the one in FIG. 14 may serve as a design feature that is effective for creating a vibrating effect for the user to know where they are at in the process as they interact with the hardware via the method shown in FIGS. 4A, 4B, and 4C of the first embodiment when the hardware is installed in furniture modules 100, 200. In various different embodiments, as shown by the differences between FIG. 11A and FIG. 11B, 825B may protrude along the X axis at different amounts. By changing the dimensions and geometries from what's listed on FIG. 11A to what's listed on FIG. 11B, one can change the activation force required in the Z+ and Z− directions to lock the pieces in final position (first embodiment FIG. 4C) and unlock the pieces from the final position, respectively. Different activation forces are relevant in different sets of use cases to counteract varying amounts of force applied to furniture modules the hardware are used within a real-life, functional, live-use setting.

As shown in FIG. 6 and in detail in FIG. 10A, 825C is a cavity, on the X axis, along the wall 821. Along the Z axis, it is a flat surface with rounded surfaces on each end, the cylindrical shape of 825B on one end and a rounded edge on 821 at the other end. As shown in FIG. 11A, when the E shaped piece (810) is in its locked position (FIG. 4C of first embodiment) within the plate shaped piece (820), 815 touches the side wall (821) to prevent movement along the X axis. Also shown in FIG. 11A, 815 touches the side wall (821) on the Z+ axis side and touches 825B on the Z− side. It touches in 3 linear series of points along the Y axis at each of the 3 locations mentioned and illustrated in FIG. 11A.

For practical intents and purposes, other components of this embodiment that aren't mentioned in detail above function similarly to the embodiment shown in the first embodiment. For example, the prongs of 811A, 811B, 811C when interacting in tandem with surfaces 823A, 823B, and 823C prevent upward movement (Y+ direction).

As a system of 2 parts (810, 820) working together, with features 825A, 825B, and 825C working in sequence through the interactions as shown in FIGS. 4A, 4B and 4C of the first embodiment, the track (825) creates a specific user experience that directs the user from loading position (the position shown in FIG. 4B) to the final position (the position shown in FIG. 4C). In the embodiment shown by the figures, the track allows for the user to move the E shaped hardware (810) along the Z axis directions while having a little bit of "wiggle" room in the X axis directions along the length of 825A. When the protrusion (815) touches the barrier feature of the track (825B) and when there is a sufficient activation force applied in the Z+ direction to activate the detent member (814, 815), 814L and 814R bend inward, in the X− and X+ direction respectively. As the force is applied over time in the Z+ direction, 814L and 814R bend increasingly inward in the X− and X+ direction, respectively. As force is continually applied and the protrusion (815) moves across the point marked as 925 (as marked in FIG. 11A), 814L and 814R start to flex back outward, in the X+ and X− directions respectively, towards assuming its freestanding position. The detent member compromising of 814 and 815 interacts with the barrier on the track 825B by creating a motion that is similar to the way that crash cymbals are played. Contact is made by brushing upward and outward at an angle. By an interaction created by such a movement, a louder sound than otherwise is projected outward toward the user in the Y+ direction than if there wasn't an angular motion during impact. There are design considerations that exist for the design of 825B relative to 825A and 825C and also 825B relative 814 and 815. In this case, because of how thin 814 has to be and how little material is used to connect 814 to the main body (812) of the E shaped piece (810), the louder noise comes at the expense of reduced durability. In alternate embodiments, increased durability may be achieved by designing a flexing detent member that flexes outward in a singular direction during impact and not both upward & outward. Lastly, when the two pieces, 810 and 820, reach the position shown in FIGS. 6, 11A, & 11B (FIG. 4C of the first embodiment), each set of 814 and 815 are back to their freestanding positions.

The various pieces of the embodiment shown in the figures provided is designed for manufacturing with flexible materials (like ABS plastic, nylon). In other embodiments with other designs of the same components, manufacturing may be done with less flexible materials, like various metals. In yet other embodiments, manufacturing may be done with a combination of materials, for example, the plate may be made with cast iron, with the E made as ABS plastic. The materials for manufacturing are not limited to just those mentioned above.

It is important to note that the embodiment of the track shown in the FIGS. 6, 7, 9, and 11 is one of many. Additional alternative embodiments and considerations of the system are described below.

The track and each of its components are meant to create a specific user experience. It defines the range of possible motion and the user's sensory feedback received while making those allowed movements. Each element of the track creates an element of the overall experience. The summation of the experiences creates an experience for the user in connecting the pieces of hardware without being able to see it in action (it is typically used when embedded in between 2 pieces of furniture). Design features will create an interaction of the hardware that creates a tactile response during use that may enable a user to operate the hardware with more ease, to navigate between the various steps for proper use with more ease, with a more intuitive learning curve, with more confidence, more emotional comfort and trust in effectiveness of the product. The design may also affect the activation force required to operate the system at various points in the user process. The design goals are not limited to what's specifically mentioned in this embodiment.

For example, the embodiment shown in the figures of the first embodiment shows the detent member (14, 15) as a mechanical insert while the embodiment shown in the FIGS. 6-11 shows the detent member (814, 815) as built directly into the body of the E shaped piece. In other alternative embodiments, the arm that flexes/detent member (814, 815) is not limited to being parts built in (814, 815) nor to mechanical inserts (14, 15 from the first embodiment). The detent mechanism may exist as a combination of parts built in and of mechanical inserts. Inserts are not limited to strictly mechanical inserts. They may be electro-mechanical and/or entirely electrical, in the form of computer chips, linked to batteries built into either piece of hardware (810, 820). The corresponding elements of the track may also include electro-mechanical and electrical inserts to interact with the inserts used with the detent mechanism. They may transmit information that's digital in form in addition to creating a physical sound and a given tactile feel discernible via physical touch.

Figure 16:
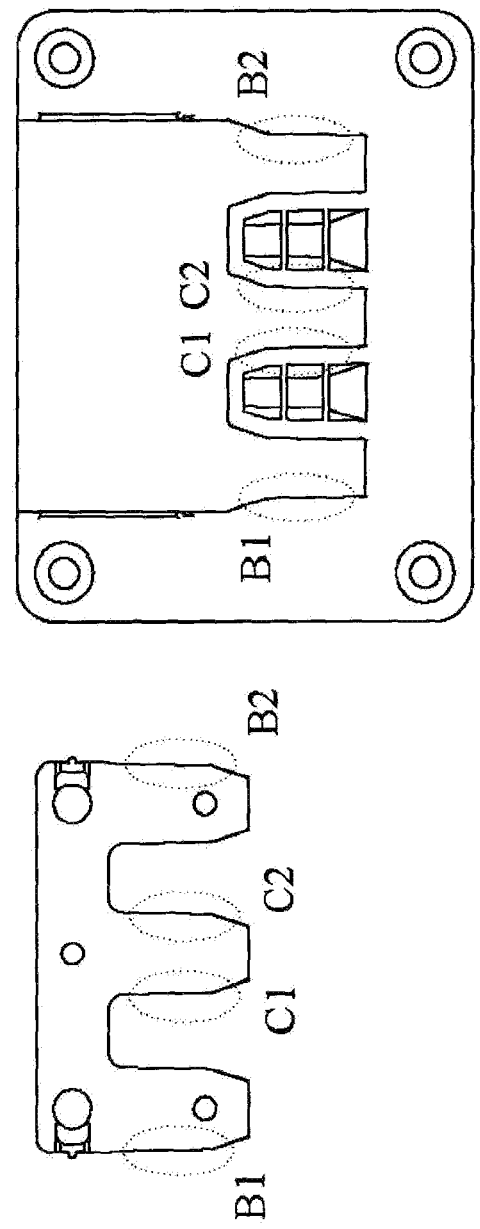
FIG. 16 is an overhead view of each piece that illustrates various locations for the track/detent mechanism combinations.

It is also important to note that the dynamic that exists within the confines of the plate shaped piece (820), the E shaped piece (810), and their interactions with one another as a whole as defined by the track(s) of any embodiment is one of many possible alternative embodiments. The detent member that is created by a flexible thin wall (814) and protrusion (815) may exist in various different locations relative to the other parts and also exist in various different physical forms. For example, an alternative embodiment may have the thin flexible wall (814) and protrusion (815) exist instead as pentagonal prongs, as described earlier, that extend from the body (812) of the E shaped piece (810) where the center undercut (811B) exists in FIG. 6. This is illustrated in FIG. 16 and this location is denoted C1 and C2 as indicated by dashed-line ovals. In such a design, the equivalent of 2 tracks (each containing a set of components such as 825A, 825B, and 825C) may exist where 823BL and 823BR is on the plate shaped piece (820). In addition to achieving advantages in durability and setting two different activation forces as mentioned above, such a design is useful to minimize physical exposure of the prongs when the hardware is attached to furniture (100, 200 of FIGS. 4A, B, and C of the first embodiment) to damage when the user initially sets the 2 pieces into the position shown by FIG. 4B of the first embodiment. Similarly another alternative embodiment may have the 2 pentagonal prongs exist on the outward facing surface of 811A and 811C. This is illustrated in FIG. 16 and this location is denoted B1 and B2. The corresponding tracks for a design with detent mechanisms in those positions may exist at the undercut 823AL and 823CR.

Additionally, it is possible to have alternative embodiments where the track (825) and its features consisting of a first elongation (825A), a barrier (825B), and a second elongation (825C) exist on the E shaped piece (810) and have the complementary detent mechanism and its features (814, 815) exist on the plate shaped piece. In such embodiments, the components of the detent mechanism (814, 815) can exist in many various locations within the plate shaped piece including, but not limited to, the location denoted by C1 and C2 as indicated by the dashed-line ovals in FIG. 11 and the location denoted by B1 and B2 of the same FIG. 11.

For some possible alternative embodiments, an entirely different set of design specifications for 814, 815, 825A, 825B, and 825C may create distinctly different operation and functionality. The insert used in lieu of the spring (14) and ball (15) does not have to exist as a detent mechanism as it is alternatively shown as a flexible wall (814) and a protrusion (815) in FIGS. 6 and 8. For example, the insert may have a function equivalent of a magnetic push latch typically used for opening and closing cabinet doors. A corresponding set of features for a track can then accommodate that alternative mechanism. An elongated protrusion may exist to guide the part of the latch that protrudes from the E shaped piece. A barrier may exist to activate the latch in a particular way. A second indentation may exist to keep the activated latch in place. In such a case, the activation and deactivation of the magnetic latch would require the user to have a continuous push in one direction along the Z axis and then make a singular application of significantly greater force in the X axis against one of the side walls (821L, 821R, 823AL, 823AR, 823BL, 823BR, 823CL, 823CR) of the plate shaped piece (820). This would differ from the embodiments shown, where a continuous motion of a sufficient applied force in the Z axis is enough to activate and deactivate the detent mechanism. The possibilities of built in functionalities in lieu of the spring (14) and ball (15) and flexible wall (814) and protrusion (815) and its corresponding tracks are not limited to detent mechanisms and magnetic latches.

Figure 12A:
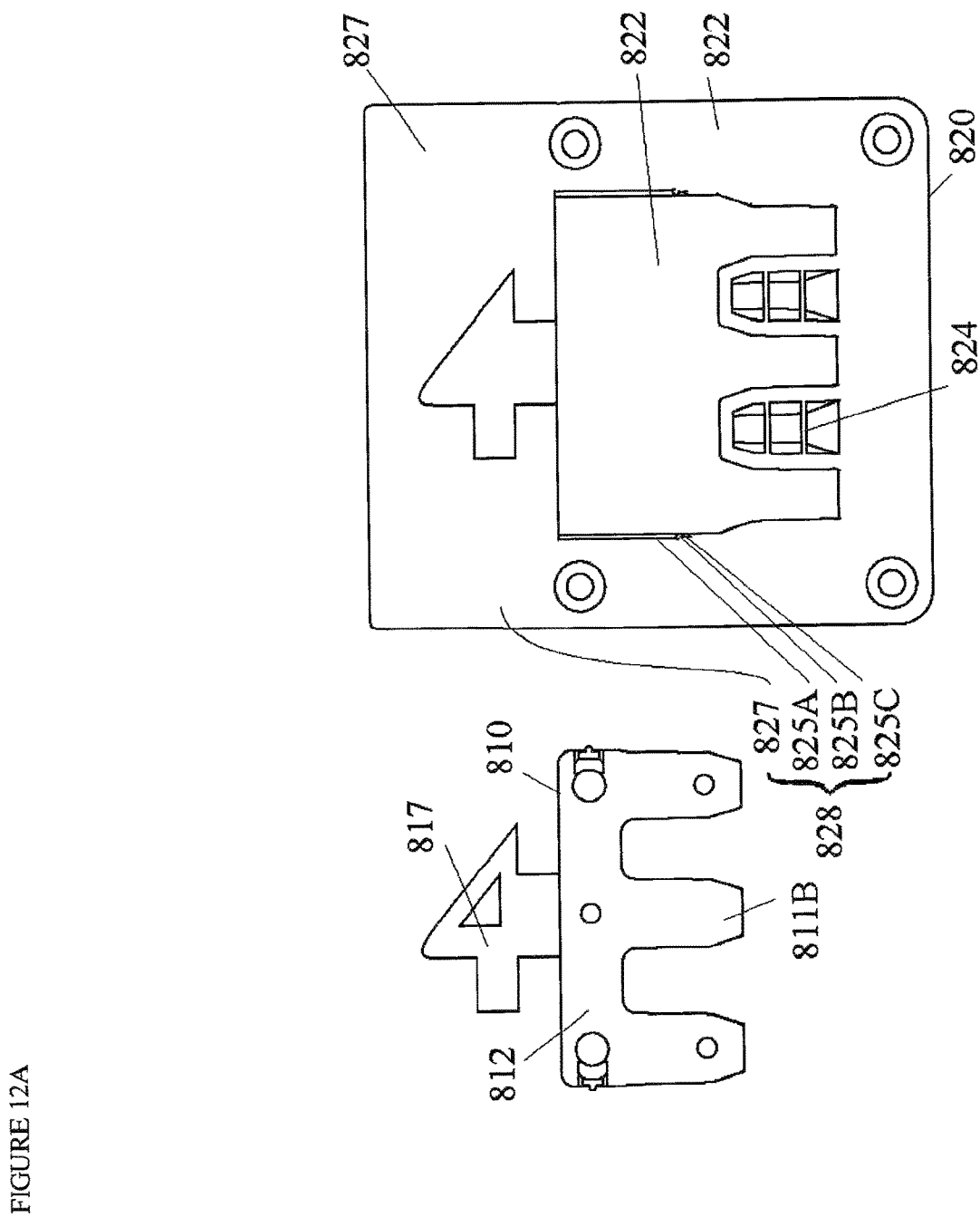
FIGS. 12A-C show the two hardware pieces in an alternative embodiment with an additional barrier that serves as a lock and key feature, where
Figure 12B:
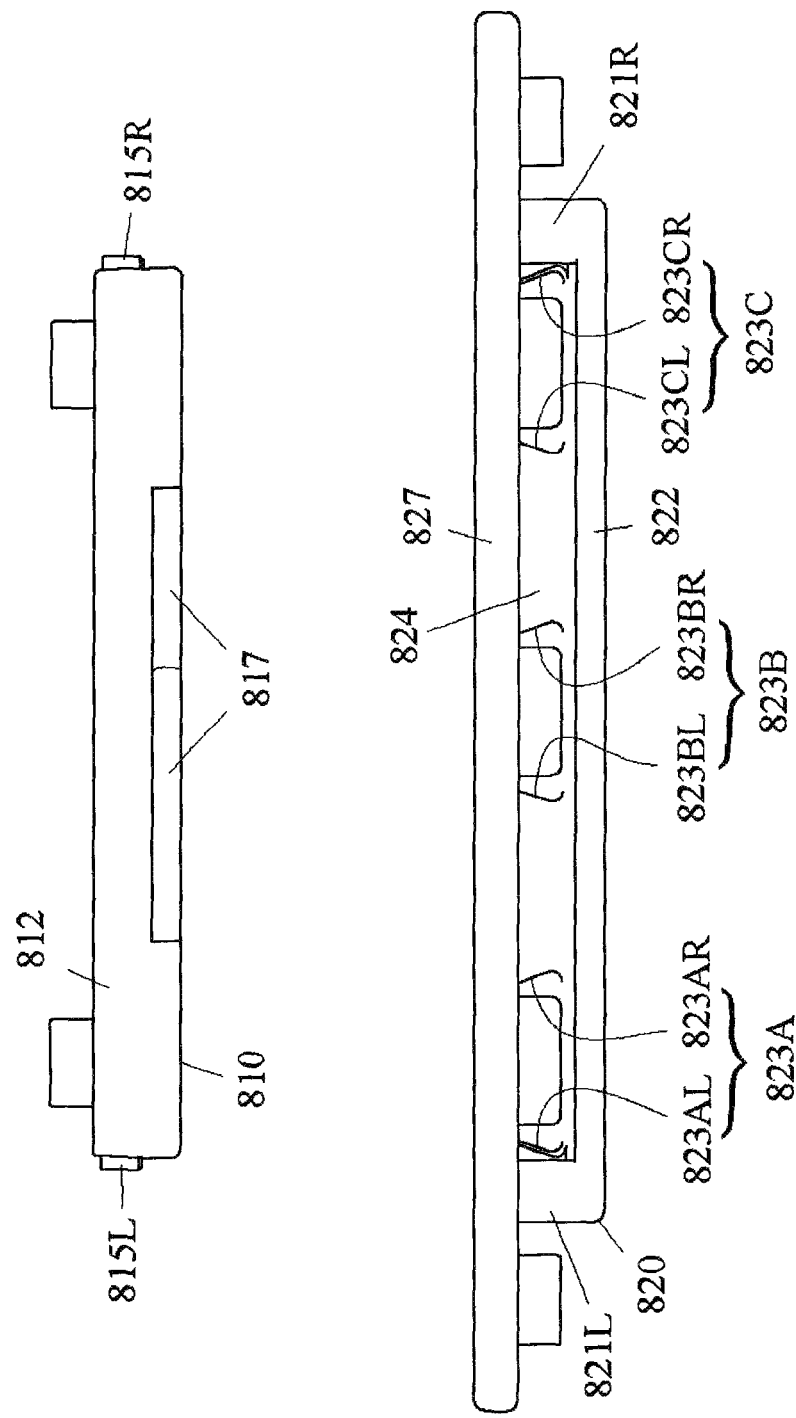
Figure 12C:
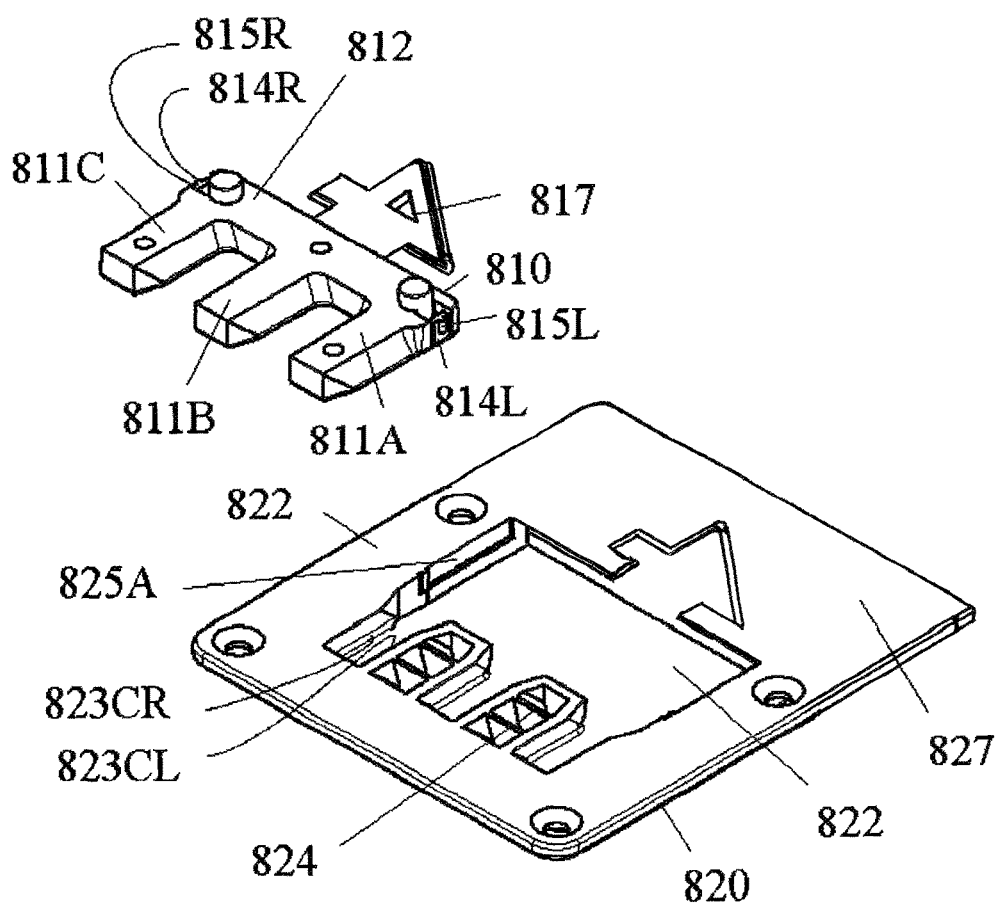

In yet other alternative embodiments, the track may have features before indentation 825A. For example, as shown in FIGS. 12A, 12B, and 12C, an added feature to the E shaped piece (810) that is a shaped extension (817) to the body (812) and an added feature to the plate shaped piece (820) that serves as a barrier ceiling (827) can create a lock and key type of device to the interaction between the two pieces of hardware. In this variation, shown in FIGS. 12A, 12B, and 12C, the E shaped piece (810) has a solid mass of a defined shape (817) that protrudes from the Z– edge of the E shaped piece (810). In this variation, the corresponding track to accommodate this additional mass may have an additional feature that consists of an upper wall/ceiling (827) along the same plane of the top surface that has the holes for screws (822). As illustrated by FIG. 12B, the upper wall/ceiling (827) has the same thickness as the top surface that has the holes for screws (822). The upper wall/ceiling (827) is solid with the exception of a hole cut in the same defined shape of the solid mass that protrudes from the E piece (817). By adding these two elements (817, 827), to 810 and 820 respectively, it essentially creates a position before the loading/unloading position. It creates a step in the operation of the hardware that exists before what's shown in FIG. 4B of the first embodiment.

By having the feature of a barrier ceiling (827) added to the track, the detent mechanism (814, 815) of the E piece (810) cannot interact with 825A until the added extension (817) from the E piece (810) is fitted carefully through the cut hole that exists from the added wall/ceiling (827) of the plate shaped piece (820). When starting at the position shown in FIG. 7C, in order to reach the position shown in FIG. 4B, the user must first carefully fit the added extension (817) of the E shaped piece (810) through the hole of the same shape in the barrier ceiling (827). The barrier ceiling (827) blocks all angles and points of entry except for 1. The only way to do so is for the user to keep the surface (100) the E shaped piece (810) is attached to parallel to the surface (200) the plate shaped piece (820) is attached to and simultaneously align the added extension (817) of the E shaped piece (810) precisely directly above the corresponding hole of the barrier ceiling (827) while the user lowers the surface (100) with the E shaped piece (810) attached into the position shown in FIG. 4B. After the surface (100) with the E shaped piece (810) is lowered to the position shown in FIG. 4B, the added extension (817) of the E shaped piece (810) rests completely underneath the barrier ceiling (827) as illustrated in the profile view of the added extension (817) and barrier ceiling (827) provided by FIG. 7B. FIG. 7B shows the relative thicknesses of the two features (817, 827). In normal operation of the embodiment shown in FIGS. 7A-C, as the user moves the pieces in the direction of the arrow shown in FIG. 4B, the added extension (817) of the E shaped piece (810) continues to remain underneath the barrier ceiling (827). While it is moving, the user cannot lift upward in the Y+ direction without the added extension (817) hitting the barrier ceiling (827). Movement in the Y+ direction is thus prevented by the barrier ceiling (827).

The added wall/barrier ceiling (827) serves as a barrier that creates a dynamic where there is essentially just one way to get to the first elongated indentation (825A) in the direction of the locked position of FIG. 4C of the first embodiment and just one way to get out of the indentation 825A going away from the direction of the locked position of FIG. 4C of the first embodiment. It creates a directed pathway that restricts, enables and guides the user in a specific way. With this directed pathway feature that has a barrier before (827) and a barrier (825B) after the indentation/cavity (825A), the hardware can only separate itself when the user lifts directly upward, applying upward force only along the Y axis at a precise location. A feature like this is useful because it creates a failsafe for improper use. Since the hardware cannot dislodge without a series of carefully controlled, distinct movements, it greatly reduces the possibility that accidental force will completely dislodge the connection created by the 2 pieces of hardware, 810 and 820. This feature also illustrates that the track's purpose is to restrict, enable and guide the user in a specific way within the system created by the hardware.

The above example of the lock and key type of device demonstrates that the track as a grouping of features within the plate shaped piece (820) is not limited to a sequence of 3 distinct features. There may exist any number of features of the track before 825A, such as the lock and key feature described in the preceeding paragraph, and any number of features of the track after 825C. For example, secondary, tertiary, and so on, final positions may exist after 825C. FIG. 17 shows a case where track (655) has 2 final positions (655C and 655G). In such a case, more careful considerations may be made to indentation 825C to accommodate an added feature of the track. A secondary final position may exist after the indentation 825C to create furniture with a staggered aesthetic, where surfaces and edges aren't flush with one another. A tertiary final position may exist after the secondary final position to enable different, prescribed design options for the staggered aesthetic.

The above example of the lock and key type device shown in FIGS. 7A-C also demonstrates that the sequence of features may start with a barrier instead of starting with an indentation/cavity. It may start with a barrier that directs a specific path toward an indentation/cavity and a barrier that follows. Worded differently, it is a demonstration that a directed pathway (828) can be created that starts with a barrier (827) that leads into what is referred to as a track (825) throughout this description.

Figure 13A:
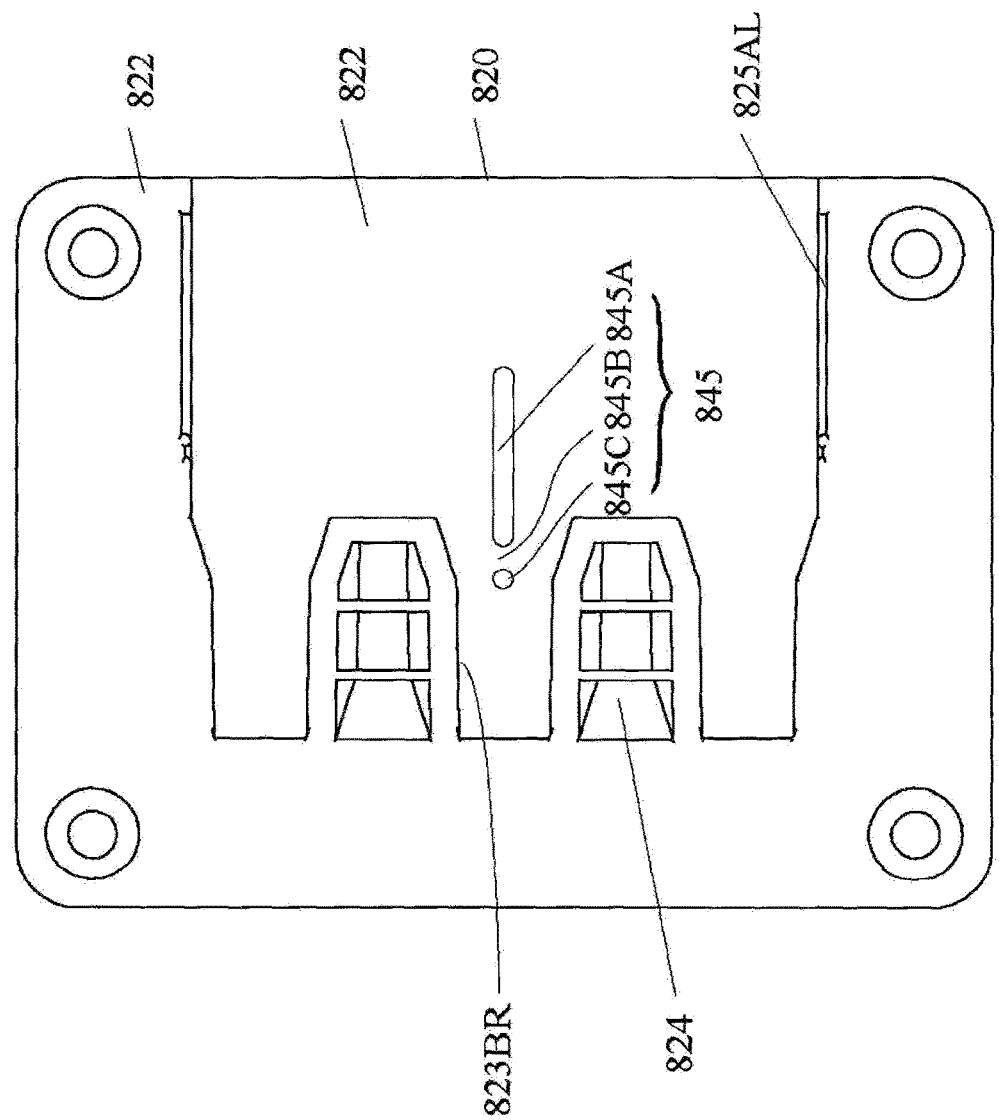
FIGS. 13A-B show an alternative embodiment with different types of tracks, where
Figure 13B:
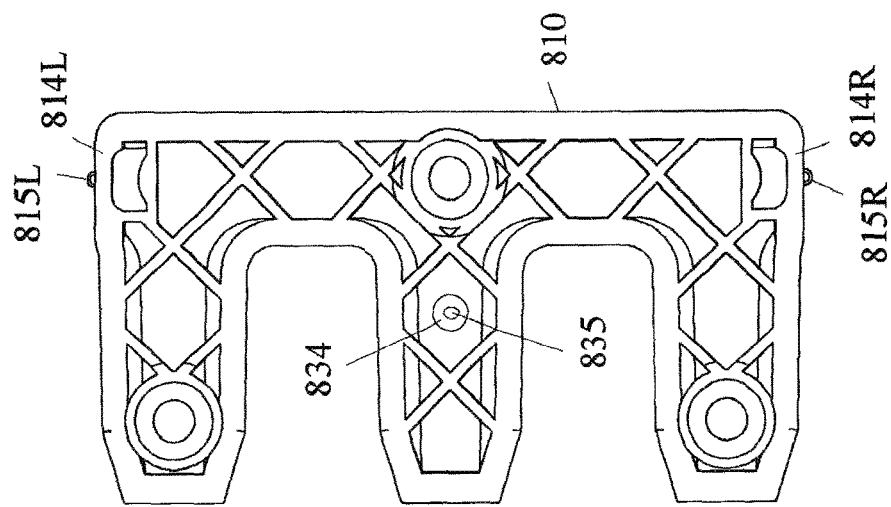

In additional alternative embodiments, the system may include multiple tracks and multiple sets of detent mechanisms, with each set providing a distinctly different function. For example, as shown in the first embodiment, the detent mechanism (14, 15) faces downward (axis Y−) toward the bottom wall of the plate (22) and as shown in the FIGS. 6-11 provided, the 2 detent mechanisms (814L, 815L & 814R, 815R) face outward (X+ and X−) toward the 2 side walls of the plate (821L, 821R), there may exist an alternative embodiment that features both of these track designs. This is illustrated by FIGS. 13A and 13B. In FIG. 13B, the feature 834 is assumed as the same as feature 14 of the first embodiment and the feature 835 is assumed as the same as feature 15 of the first embodiment. While this is so, in other embodiments, the equivalent detent mechanism function that the spring (14) and ball (15) create can exist at the location denoted as 834 and 835 in other forms like ones similar to the flexible thin wall (814) and the protrusion (815) or other forms not explicitly illustrated in the figures provided.

As shown by FIG. 17, there may exist an alternative embodiment that has all 3 of these detent mechanisms like the design of the E shaped piece (810) shown in FIG. 13B and that has a design of the plate shaped piece (820) that includes 5 tracks, that exist across multiple planes. In some embodiments, there may be more detent mechanisms than tracks and vice versa. Detent mechanisms and tracks do not have to exist in pairs. As shown by FIG. 17, this variation of the plate shaped piece (820) has 4 undercuts (823A-D) instead of the 3 that are shown in FIG. 6 by 823A, 823B, and 823C. The 2 tracks (825R, 825L) along side walls (821R, 821L) serve the purpose as outlined above in guiding the E shaped piece (810) from the starting loading/unloading position (FIG. 4B of the first embodiment) to the final locked position (FIG. 4C of the first embodiment). On surface 822, the 3 tracks (645, 655, 646) on the plate (820) underneath the E shaped piece (810) may be part of an expanded system of tracks. In this alternative embodiment, there are 2 tracks parallel to one another (645, 655) and one track that is perpendicular (646) to those that connect the 2 parallel tracks (645, 655). The first track (645) may take the form and position of the track of the first embodiment (25A, 25B, 25C). The first additional track (655) may exist in a position in line with the 3rd undercut 823C. Track 655 has a barrier (655D) that creates a directed pathway toward indentation/cavity (655E) and barrier (655F). As illustrated in FIG. 17, 655A-C and 655D-G are separated by barrier (655D) that creates a directed pathway toward 655E-G. 655A-C and 655E-G are the same as 645A-C and 25A-C with the exception of differences in the length of the elongated indentation (i.e. 655A, 655D, 645A, 25A). They also function in the same way. The only difference is that the user has to push the E shaped piece (810) toward the undercuts (823B, 823C) for a different distance before the detent mechanism (814, 815) interacts with the barrier (655B, 645B, 825B, 25C). The second additional track (646) is the track perpendicular to those tracks (645, 655) that may connect the 2. This additional track (646) has barriers and features of its own, at the start (the most Z− end) of the 2 parallel tracks.

As shown in FIG. 17, the perpendicular track (646) is a directed pathway where there is a first barrier (646A) connected to a second barrier (646C) by an elongated indentation/cavity (646B). The purpose of the second additional track (646) is to navigate between the 2 parallel tracks (645, 655) in a specific way that restricts, enables, and guides movement between the 2 parallel tracks (645, 655). The purpose of the 2 parallel tracks (645, 655) may work in conjunction with the tracks along the side walls (821L, 821R) to create the centering effect described earlier. As shown in FIG. 17, the barriers, 646A, 646C, 645B, 655B, and 655F are designed similarly as just flat planes of a prescribed width and length. In other embodiments of this directed path, the barriers 646A and 646C may have separate and unique design features that distinguish itself from one another and from other barriers within the same system like 645B, 655B, and 655F. As shown in FIG. 17, the various indentations/cavities, 646B, 645A, 645C, 655A, 655C, 655E and 655G are also similar and differ only in length. In other embodiments of this directed path, the indentation 646B may also have separate and unique design features that distinguish itself from the other indentations within the system.

For the alternative embodiment that pairs the E shaped piece (810) shown in FIG. 13 with the plate shaped piece (820) shown in FIG. 17, the operation is similar to the other embodiments in that the user loads the E shaped piece into the cavity of the plate shaped piece where the ball (835) attached to the spring (834) is in contact with the indentation (645A) of the track (645) while the protrusion (815) attached to the thin wall (814) is in contact with the indentation of (825A). As the user slides in the direction of the arrow in FIG. 4B, the protrusion (815) moves along indentation (825A) while the ball (835) moves along the indention (645A). The protrusion (815) and ball (835) moves into the locked positions 825C and 645C by engaging with barrier 825B and 645B. The difference is that in this alternative embodiment, the user may choose to slide the attached piece (100) in the direction of the arrow shown in FIG. 17 instead of the direction of the arrow shown in FIG. 4B after the ball (835) initially comes into contact with the indentation (645A) and the protrusion (815) comes into contact with the indentation (825A) at the Z− most point allowed. This option is enabled by engaging ball (835) with barrier (646A). The user may continue to push along this direction and have the ball (835) interact with the directed pathway (646). The ball (835) moves along indentation 646B and past the second barrier (646C) into the Z− most point of indentation 655A. The ball (835) can then move along the track created by 655A-C. At indentation 655C, the user may choose to stop at this secondary locked position. The user may also choose to continue pushing in the Z+ direction and engage the ball (835) with a directed pathway that starts with barrier 655D. When the ball (835) moves past barrier 655D and it interacts with the track created by 655E-G. To achieve the tertiary locked position, the user may choose to keep pushing in the Z+ direction until the ball (835) is lodged into the indentation 655G.

As shown in FIG. 17, it is important to note that each track may have its own design considerations within itself and also design considerations that work along with the rest of the system. Track 655 differs from track 645 in that it features both a first final position at indentation 655C and a secondary final position at indentation (655G). Despite that difference, track 655 interacts with the track (825R) on the side wall (821R) to align the E shaped piece (810) relative to the plate shaped piece (820) in the same way track 645 does with the track (825L) on the side wall (821L).

Ultimately, each design consideration on its own yields a different tactile feel and/or auditory signal and achieves a different range of motion for the surfaces (100, 200) attached to each of the hardware pieces (810, 820). Each combination of design considerations also yields a different set of tactile feels and/or auditory signals and set of ranges of motion.

In conclusion, there are many possible variations of parts 25A, 25B, and 25C from the first embodiment. Each change in the geometry of the barrier of 825B or the indentations of 825A and 825C can materially change the way the track restricts, enables, and guides movement as force is applied to the system created by the two pieces of hardware. Each different way of restricting, enabling and guiding movement will yield its own set of tactile feel(s) and auditory signal(s). There are also many possible variations of the detent member (14, 15) on the E shaped piece (10), from the first embodiment. Each design change and different geometry of features 814 and 815 can warrant a corresponding change in the interaction it has with the corresponding track. The design of these two parts, the track and the detent mechanism, are meant to work together to create a system that's robust and user friendly. The number of possible designs based on the framework presented by each of the components of a given track, each track as a whole that consist of a sequence of 3 or more components, and the system of 1 or more tracks with a specific design of the pair of hardware pieces are essentially limitless. The sequences of 3 or more components may start with the framework labeled as a track where there is a first indentation and a second indentation separated by a barrier or may start with the framework labeled as a directed pathway where there is a first barrier connected to a second barrier by an indentation. The possibilities are not limited to what is specifically presented as alternative embodiments in this disclosure.

It will be apparent to those skilled in the art that various modification and variations can be made in the connector hardware of the present invention without departing from the spirit or scope of the invention. Thus, it is intended that the present invention cover modifications and variations that come within the scope of the appended claims and their equivalents.

What is claimed is:

1. A connector for joining two furniture modules or other objects, comprising:

a first hardware piece;

a second hardware piece having a main cavity for receiving the first hardware piece, wherein the first and second hardware pieces are in an unlocked state when the first hardware piece is received in the main cavity of the second hardware piece, the second hardware piece further having one or more receiving cavities connected to the main cavity for receiving at least a portion of the first hardware piece, wherein the first and second hardware pieces are in a locked state when the portion of the first hardware piece is received in the one or more receiving cavities of the second hardware piece, and wherein the first hardware piece is slidable along a first direction within the second hardware piece to change between the unlocked state and the locked state; and a detent mechanism, including a first part disposed on a first one of the first and second hardware pieces and a second part disposed on a second one of the first and second hardware pieces, wherein the first and second parts of the detent mechanism engage with and cooperate with each other to hold the first and second hardware pieces in the locked state, and to allow the first and second hardware pieces to change from the locked state to the unlocked when a sufficient force is applied, wherein the first part of the detent mechanism comprises a detent member affixed to the first one of the first and second hardware pieces, the detent member including a protruding end and a resilient biasing member, the resilient biasing member configured to urge the protruding end toward a second direction perpendicular to the first direction and is retractable in a direction opposite to the second direction when an external force is applied, wherein the second part of the detent mechanism includes a track formed on the second one of the first and second hardware pieces, wherein the track includes a first section and a second section separated by a barrier, wherein the barrier protrudes in the direction opposite to the second direction relative to the first section and the second section, and wherein when the first and second hardware pieces move between the unlocked state and the locked state along the first direction, the protruding end of the first part of the detent mechanism moves along the first section of the track and moves between the first section of the track and the second section of the track over the barrier, wherein the protruding end protrudes less in the second direction when it moves over the barrier, and wherein when the first and second hardware pieces are in the locked state, the protruding end is located in the second section of the track.

2. The connector of claim 1, wherein the first section of the track includes a series of protrusions, indentations, and varying surfaces in a series configured to create mechanical interactions with the protruding end as the protruding end travels along the first section of the track.

3. The connector of claim 1, wherein the track further includes a third section separated from the first section by another barrier, wherein the other barrier protrudes in the direction opposite to the second direction relative to the first section and the third section.

4. A connector for joining two furniture modules or other objects, comprising:
  a first hardware piece;
  a second hardware piece having a main cavity for receiving the first hardware piece, wherein the first and second hardware pieces are in an unlocked state when the first hardware piece is received in the main cavity of the second hardware piece, the second hardware piece further having one or more receiving cavities connected to the main cavity for receiving at least a portion of the first hardware piece, wherein the first and second hardware pieces are in a locked state when the portion of the first hardware piece is received in the one or more receiving cavities of the second hardware piece, and wherein the first hardware piece is slidable along a first direction within the second hardware piece to change between the unlocked state and the locked state; and
  a detent mechanism, including a first part disposed on a first one of the first and second hardware pieces and a second part disposed on a second one of the first and second hardware pieces, wherein the first and second parts of the detent mechanism engage with and cooperate with each other to hold the first and second hardware pieces in the locked state, and to allow the first and second hardware pieces to change from the locked state to the unlocked when a sufficient force is applied,
  wherein the first part of the detent mechanism comprises a detent member affixed to the first one of the first and second hardware pieces, the detent member including a protruding end and a resilient biasing member, the resilient biasing member configured to urge the protruding end toward a second direction non-parallel to the first direction and is retractable in a direction opposite to the second direction when an external force is applied,
  wherein the second part of the detent mechanism includes a track formed on the second one of the first and second hardware pieces, wherein the track includes a first section and a second section connected by a barrier, and
  wherein when the first and second hardware pieces move between the unlocked state and the locked state along the first direction, the protruding end of the first part of the detent mechanism moves along the first section of the track and moves between the first section of the track and the second section of the track by interacting with the barrier, wherein the protruding end protrudes less in the second direction when it interacts with the barrier, and wherein when the first and second hardware pieces are in the locked state, the protruding end is located in the second section of the track.

5. The connector of claim 4, wherein the first section of the track includes a series of protrusions, indentations, and varying surfaces in a series configured to create mechanical interactions with the protruding end as the protruding end travels along the first section of the track.

6. The connector of claim 4, wherein the track further includes a third section separated from the first section by another barrier, wherein the other barrier protrudes in the direction opposite to the second direction relative to the first section and the third section.

* * * * *